(12) United States Patent　　(10) Patent No.:　　US 7,983,139 B2
Hurst, Jr. et al.　　(45) Date of Patent:　　*Jul. 19, 2011

(54) SMALL FORM FACTOR OPTICAL DATA STORAGE DISC AND CARTRIDGE

(75) Inventors: Jerry E. Hurst, Jr., Boulder Creek, CA (US); Neil Deeman, Alamo, CA (US); Steven B. Volk, Boulder, CO (US)

(73) Assignee: Vmedia Research, Inc., Boulder, CO (US)

( * ) Notice: Subject to any disclaimer, the term of this patent is extended or adjusted under 35 U.S.C. 154(b) by 627 days.

This patent is subject to a terminal disclaimer.

(21) Appl. No.: 11/998,761

(22) Filed: Nov. 30, 2007

(65) Prior Publication Data

US 2009/0144763 A1　　Jun. 4, 2009

(51) Int. Cl.
*G11B 7/24*　　(2006.01)
(52) U.S. Cl. ..................................... 369/275.1; 720/718
(58) Field of Classification Search ............... 369/275.1, 369/375.3, 47.14, 53.35, 53.1, 47.55, 53.22, 369/47.27; 720/630, 718
See application file for complete search history.

(56) References Cited

U.S. PATENT DOCUMENTS

| | | | | |
|---|---|---|---|---|
| 5,140,489 A | 8/1992 | Barnard | ..................... | 360/133 |
| 5,475,674 A | 12/1995 | Yamashita et al. | ............ | 720/735 |
| 5,521,895 A | 5/1996 | Miura et al. | .................. | 369/47.4 |
| 5,748,443 A | 5/1998 | Flint et al. | ..................... | 361/686 |
| 5,974,024 A | 10/1999 | Konishi et al. | ................ | 369/282 |
| 6,052,279 A | 4/2000 | Friend et al. | .................. | 361/686 |
| 6,091,563 A | 7/2000 | Thomas, III et al. | ........... | 360/69 |
| 6,137,759 A | 10/2000 | Ogiro et al. | .................... | 720/640 |
| 6,141,306 A | 10/2000 | Andoh | ........................ | 369/53.35 |
| 6,154,441 A | 11/2000 | Sandstrom et al. | ........... | 369/282 |
| 6,185,069 B1 | 2/2001 | Schick | .......................... | 360/133 |
| 6,236,540 B1 | 5/2001 | Meguro | ........................ | 360/133 |
| 6,298,533 B1 | 10/2001 | Nishimura et al. | .......... | 29/243.5 |
| 6,414,925 B2 | 7/2002 | Andoh | ........................ | 369/53.24 |
| 6,442,637 B1 | 8/2002 | Hawkins et al. | .............. | 710/300 |
| 6,515,830 B1 | 2/2003 | Meguro | ........................ | 360/133 |
| 6,525,932 B1 | 2/2003 | Ohnishi et al. | ................ | 361/686 |
| 6,665,261 B2 | 12/2003 | Okamoto et al. | ............. | 720/738 |
| 6,687,215 B1 | 2/2004 | Bagnell et al. | ................ | 720/740 |
| 6,751,694 B2 | 6/2004 | Liu et al. | ....................... | 710/301 |
| 6,762,906 B1 | 7/2004 | Wkita et al. | ............... | 360/97.01 |
| 6,779,194 B2 | 8/2004 | Okamoto et al. | ............. | 720/725 |
| 6,813,661 B2 | 11/2004 | Li | ................................... | 710/62 |
| 6,826,018 B2 | 11/2004 | Kuwajima et al. | .......... | 360/254.3 |
| 6,831,888 B2 | 12/2004 | Roberts | ......................... | 720/728 |
| 6,873,524 B2 | 3/2005 | Kaczeus, Sr. et al. | ........ | 361/685 |
| 6,934,568 B2 | 8/2005 | Charlier et al. | ............. | 455/575.3 |
| 6,947,254 B2 | 9/2005 | Edwards et al. | ........... | 360/99.09 |

(Continued)

FOREIGN PATENT DOCUMENTS

JP　　08194977　　7/1996

(Continued)

*Primary Examiner* — Ali Neyzari
(74) *Attorney, Agent, or Firm* — Patentability Associates

(57) ABSTRACT

An optical data storage disc measuring 32 mm in diameter contains 1 GB of data per layer. The data is designed to be readable by a disc drive that contains a blue wavelength laser, an objective lens having a numerical aperture of 0.72 and conventional DVD controller electronics. This combination of elements allows a full-length movie or a video game to be displayed with DVD-quality on a cell phone or other portable hand held device.

9 Claims, 17 Drawing Sheets

U.S. PATENT DOCUMENTS

| | | | |
|---|---|---|---|
| 6,971,117 B2 | 11/2005 | Okazawa et al. | 720/738 |
| 7,013,476 B2 | 3/2006 | Volk et al. | 720/726 |
| 7,018,696 B2 | 3/2006 | Nee | 428/64.1 |
| 7,045,187 B2 | 5/2006 | Nee | 428/64.1 |
| 7,054,963 B2 | 5/2006 | Betts-LaCroix et al. | 710/62 |
| 7,196,981 B2 | 3/2007 | Yoshinaka et al. | 369/44.41 |
| 7,197,584 B2 | 3/2007 | Huber et al. | 710/72 |
| 7,414,938 B2 * | 8/2008 | Kuraoka et al. | 369/53.1 |
| 2001/0006503 A1 | 7/2001 | Braitberg et al. | 369/77.2 |
| 2001/0014071 A1 | 8/2001 | Braitberg et al. | 369/75.1 |
| 2001/0047453 A1 | 11/2001 | Edwards et al. | 711/115 |
| 2002/0021639 A1 | 2/2002 | Obata et al. | 369/52.1 |
| 2002/0048224 A1 | 4/2002 | Dygert et al. | 361/1 |
| 2002/0101816 A1 | 8/2002 | Braitberg et al. | 369/291 |
| 2002/0139850 A1 | 10/2002 | Glusing et al. | 235/441 |
| 2003/0007640 A1 | 1/2003 | Harada et al. | 380/270 |
| 2003/0067715 A1 | 4/2003 | Niitsuma et al. | 360/133 |
| 2003/0117938 A1 | 6/2003 | Braitberg et al. | 369/291 |
| 2003/0231570 A1 | 12/2003 | Oishi | 369/75.1 |
| 2004/0002018 A1 | 1/2004 | Oishi et al. | 430/270.13 |
| 2004/0126700 A1 | 7/2004 | Lee et al. | 430/270.15 |
| 2004/0136299 A1 | 7/2004 | Han | 369/53.26 |
| 2004/0137935 A1 | 7/2004 | Zarom | 455/550.1 |
| 2004/0212926 A1 | 10/2004 | Volk et al. | 360/133 |
| 2004/0213095 A1 | 10/2004 | Volk et al. | 369/30.63 |
| 2004/0242224 A1 | 12/2004 | Janik et al. | 455/426.1 |
| 2005/0078195 A1 | 4/2005 | VanWagner | 348/231.3 |
| 2005/0180272 A1 | 8/2005 | Bell et al. | 369/44.14 |
| 2005/0240947 A1 | 10/2005 | Volk et al. | 720/630 |
| 2005/0240954 A1 | 10/2005 | Santo et al. | 720/715 |
| 2005/0254367 A1 | 11/2005 | Volk et al. | 369/47.1 |
| 2006/0035707 A1 | 2/2006 | Nguyen et al. | 463/29 |
| 2006/0048167 A1 | 3/2006 | Volk et al. | 720/600 |
| 2006/0062095 A1 | 3/2006 | Volk et al. | 369/30.19 |
| 2006/0075342 A1 | 4/2006 | Penning | 715/704 |
| 2006/0120231 A1 | 6/2006 | Pleiss et al. | 369/44.27 |
| 2006/0121878 A1 | 6/2006 | Kelly et al. | 455/406 |
| 2006/0206582 A1 | 9/2006 | Finn | 709/217 |
| 2007/0079014 A1 | 4/2007 | Volk et al. | 710/1 |
| 2008/0205211 A1 | 8/2008 | Pleiss et al. | 369/44.27 |
| 2009/0129248 A1 | 5/2009 | Hurst, Jr. et al. | 369/272.1 |
| 2009/0147655 A1 | 6/2009 | Volk et al. | 369/108 |

FOREIGN PATENT DOCUMENTS

| | | |
|---|---|---|
| JP | 09-063104 | 3/1997 |
| JP | 2001-76456 | 3/2001 |
| JP | 2002-269960 | 9/2002 |
| JP | 2002281126 | 9/2002 |
| WO | WO 00/74049 | 12/2000 |
| WO | WO 2004/053868 | 6/2004 |
| WO | WO 2004/059453 | 7/2004 |
| WO | WO 2004/100167 | 11/2004 |

* cited by examiner

| Byte Number | Description | # of Bytes | Content | |
|---|---|---|---|---|
| 0000h – 0017h | Secure Platform Authentication String | 24 | Identifies _____ ASCII encoded string | |
| 0018h | Media Type | 1 | 00h<br>01h<br>02h - FFh | ROM Video Disc<br>ROM Data Disc<br>Reserved |
| 0019h | Media Version | 1 | 00h<br>01h<br>02h<br>03h - FFh | Single Layer<br>OTP Double Layer<br>PTP Double Layer<br>Reserved |
| 001Ah - 001Dh | Maximum Data Sectors per Surface | 4 | 00080000h<br>00080000h | ROM Video Disc<br>ROM Data Disc |
| 001Eh | Maximum Data Transfer Rate | 1 | 00h<br>NNh | 1X = 11.12 Mbit/sec<br>(NNh+1)X = (NNh+1)*11.12 Mbit/sec) |
| 001Fh | Reserved | 1 | | |
| 0020h - 002Bh | Data Zone Allocation | 12 | Bytes 0 - 3 | First sector of data zone = 00030000h for all ROM Video and Data Discs |
| | | | Bytes 4 - 7 | Last sector of data zone. A maximum value of 000B0000h for single layer ROM Video and Data Discs and PTP dual layer ROM Video and Data Discs. Assigned according to section 25 above for dual layer OTP Video and Data Discs |
| | | | Bytes 8 - 11 | Last sector of data zone on Layer 0. A maximum of 000B0000h. Assigned according to section 25 above. |
| 002Ch | BCA Descriptor | 1 | 00h<br>01h<br>02h - FFh | BCA not present<br>BCA exists<br>Reserved |
| 002Dh | Secure Platform Content Security Descriptor | 1 | 0h<br>1h<br>2h - Fh<br>Nh | Lower Nibble is Security Type.<br>0 = No Security<br>1 = CPPM Security<br>Reserved<br>Upper Nibble is Security Version Code = N |
| 002Eh - 03FFh | Reserved | 978 | Reserved | |
| 0400h - 07FFh | Reserved | 1024 | Reserved | |

| TOTAL | | 2048 | |

Fig. 5

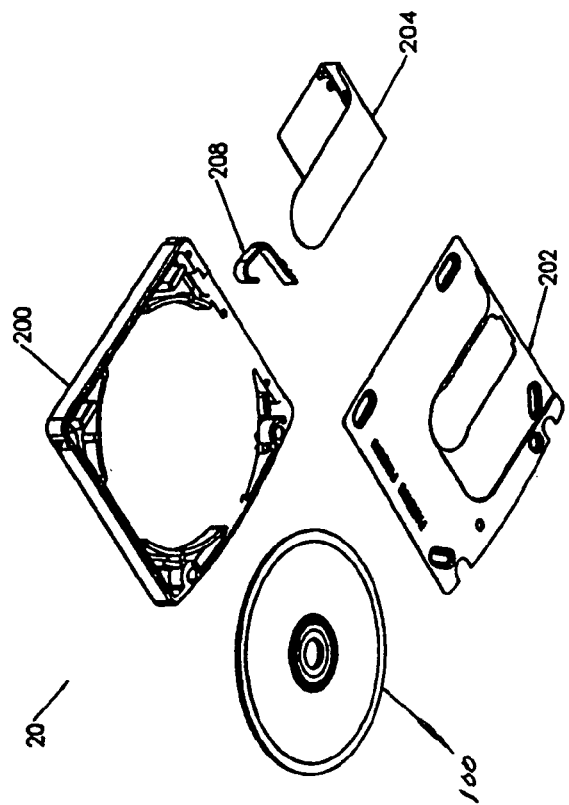
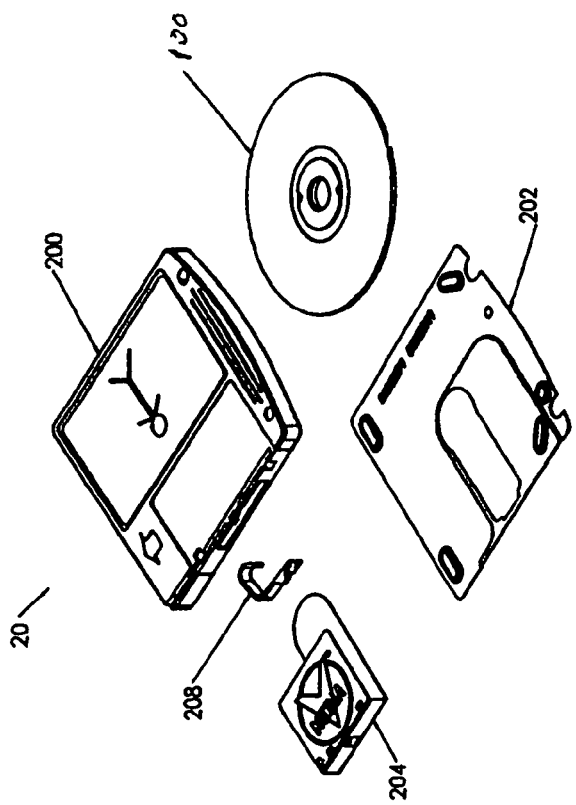

SMALL FORM FACTOR OPTICAL DATA STORAGE DISC AND CARTRIDGE

BACKGROUND OF THE INVENTION

Consumer entertainment technologies are moving towards high resolution color displays for mobile entertainment. Increasingly, consumers want to take their entertainment with them. Cross-country travelers and cross-town commuters are eagerly pursuing gaming, music and video entertainment activities on cell phones, personal digital assistants (PDAs) and portable computers. At present, however, the entertainment experience is limited, even primitive, compared to what consumers have come to expect from their game consoles, home theaters and DVD-equipped computers.

The main problem is data storage. The fact is that sophisticated digital entertainment is data-intensive, and it is growing more so every day. Traditional small "form factor," portable media such as CompactFlash® cards, SD flash cards, Memory Stick™ and other solid state memory devices simply cannot deliver the capacity and price per megabyte required for a high-quality entertainment experience. Recording content onto solid state memory cards in high volume is expensive and impractical, and securing that content effectively is very difficult.

While some experts predict that broadband Internet access will deliver high-quality games and movies to mobile consumer electronics devices, there are significant barriers to success. Cell phone networks are designed to transmit voice communications and are simply not efficient for high-capacity data transmission. Cell connections are not capable of the required speeds and are notoriously unreliable, with frequent dead zones and dropped connections. While games are being delivered to cell phones currently, the quality of game play and the game environment cannot begin to approach that of a console.

WiFi, or 802.11, wireless is designed for data transmission, and the growing number of WiFi hotspots looks attractive on the surface for delivering large amounts of data to mobile devices. Internet access and email application for multiple users are easily accommodated by WiFi. Nonetheless, managing streaming and interactive content such as multiplayer games and high-quality video or movies for thousands, if not millions, of users simultaneously will be challenging for any network. Security is also a problem for WiFi, leaving content providers open to potential pirating activities.

Moreover, the data storage problem would still exist. For any sort of networked delivery system to be viable, mobile consumer devices will have to embed significant amounts of storage to hold large, downloaded game and movie files, and to track a player's progress within the game. Perhaps the most significant problem for networked content delivery is cost. It has been estimated that it can cost more than $30 to send a DVD-quality film over the Internet.

Disc-based distribution costs are far lower, and consumers have consistently demonstrated their preference for purchasing high-value content on discs, as evidenced by the upswing in DVD sales in the last five years. Clearly, the mobile entertainment industry needs an economical, small form factor, secure data storage disc to meet the growing demand for a portable, high-quality entertainment experience. In addition to being small and secure, the disc should be capable of surviving the often harsh physical environment to which mobile electronics devices are subjected. The disc should be capable of holding sufficient data to allow a rewarding entertainment experience, whether that experience involves a video game, a movie or some other form of entertainment. To avoid the significant costs of designing a disc drive specifically adapted to play the disc, the disc should be compatible with existing disc drive technology.

BRIEF SUMMARY OF THE INVENTION

An optical data storage disc in accordance with this invention meets all of the foregoing criteria.

Foremost, the disc of this invention is small, ideally about 32 mm in diameter. By the careful choice of bit length, track pitch, start radius and end radius, it has been possible to provide one gigabyte (GB) of data in a single data layer on a 32-mm disc. One GB of data, used with advanced MPEG4 compression algorithms, is large enough to display a standard 133-minute movie with DVD-like quality. Optionally, the disc can be manufactured with two or more data layers separated by spacer layers, allowing a total capacity of two or more GB of data.

The data is designed to be read by a disc drive containing a blue wavelength laser and high numerical aperture lens of the kind disclosed in U.S. Pat. No. 7,058,959, issued Jun. 6, 2006, and incorporated herein by reference. While the disc is designed to take advantage of this highly advanced optics technology, the user data (i.e., the data containing the entertainment content) is compatible with and can be read by conventional DVD controller electronics.

To avoid possible defect problems arising from the high areal density of the data, the length and redundancy of the various regions of the lead-in or control data zone, i.e., the area of the disc that contains critical drive and copy protection information, have been increased. To avoid the chance that a single defect could appear twice in a single error correction code (ECC) block, thereby overwhelming the ECC, the inner radius of the information zone and the data density of the first data section at that radius are designed such that a single turn of the data track spiral is longer than a single ECC block.

The burst cutting area (BCA) is designed to be mastered on the disc at the same time as the other data. The BCA is designed to avoid large amplitude variations in the read-back signal that would have to be filtered before being read by the disc drive if the BCA were to be processed by a standard DVD controller IC.

The disc is housed in a protective multi-element cartridge assembly and optionally a protective plastic sleeve (pocket case). The cartridge comprises a plastic shell and sheet metal bottom cover as disclosed in Application No. 2006/0048167, filed Aug. 22, 2005, incorporated herein by reference. A sheet metal shutter opens and closes a disc access opening that is formed in the bottom cover. The cartridge is easy to manufacture, and the sheet metal bottom cover on the data side of the disc provides the short working distance required by a disc drive containing a blue wavelength laser and high numerical aperture lens, as described above. The cartridge contains a locking feature that holds the shutter in the closed position and a feature that prevents it from being wrongly oriented when inserted into a disc drive.

A retainer ring comprising a magnetic or magnetizable material is affixed around a central hole of the disc on its non-data side. The retainer ring is designed to operate in conjunction with a magnet, permanent or switchable, that is positioned on the spindle of a disc drive. Using the attraction between the magnet and the retainer ring to mount the disc on the drive spindle eliminates the need for a conventional mechanical mounting mechanism and allows the disc drive to be made thinner. The disc, which is hubless, is positioned accurately in the drive by contact between the central hole of the disc and the drive spindle, not by the retainer ring. Thus the retainer ring need not be positioned on the disc with great precision, reducing the cost of manufacture. A stacking ring is provided around the central hole on the data side of the disc. The size and location of the stacking ring are set such that no contact can occur between the information zone of the disc and the inside walls of the cartridge whether the cartridge is mounted in the drive or is being stored or transported outside the drive.

The cartridge contains location holes that interact with features in the drive to position the cartridge accurately in the drive. The clearances between the disc and the inside walls of the cartridge are designed to be small enough to allow the disc to be mounted on the spindle regardless of the relative position of the cartridge and drive when the cartridge is inserted into the drive, yet large enough to allow the disc to spin freely during operation.

Power consumption is of paramount importance in a mobile environment. To minimize power consumption, the host device with which the disc and cartridge are designed to be operated contains a large 32 megabyte (MB) or more video storage buffer. The disc drive reads the disc until the buffer is filled and then is put into a "sleep mode" until only about 8 MB of data, for example, remain in the buffer, when it again reads data from the disc until the storage buffer is full. The minimum buffer capacity of 8 MB chosen here represents about 1 minute of decoded video when 133 minutes of video is stored on a 1 GB single-layer disc and is reserved as an anti-shock measure. In a mobile environment, external shocks (vibrations or shaking) of the disc drive can occur while the drive is reading data. In this case, the drive can continue to process data from the buffer thereby allowing it to continue reading data during the shock event. As a result of the host device having a large video storage buffer, the "duty factor" of the disc drive, i.e., the percentage of the time that the disc drive is actually reading data from the disc, is less than 20%. In addition, the interface between the host device and the disc drive has a switch that allows the user to completely shut off the disc drive when it is not in use, even while the host device (e.g., a cell phone) is otherwise being used.

The numerous features and advantages of this invention will become more apparent from the following detailed description read in conjunction with the following drawings, in which like elements are given the same reference numeral.

BRIEF DESCRIPTION OF THE SEVERAL VIEWS OF THE DRAWING

FIG. 5 is a table showing the byte descriptions of the physical format information in an optical data storage disc according to the invention.

FIGS. 9A and 9B are exploded views of a cartridge for a disc of this invention.

DETAILED DESCRIPTION OF THE INVENTION

Figure 1A:
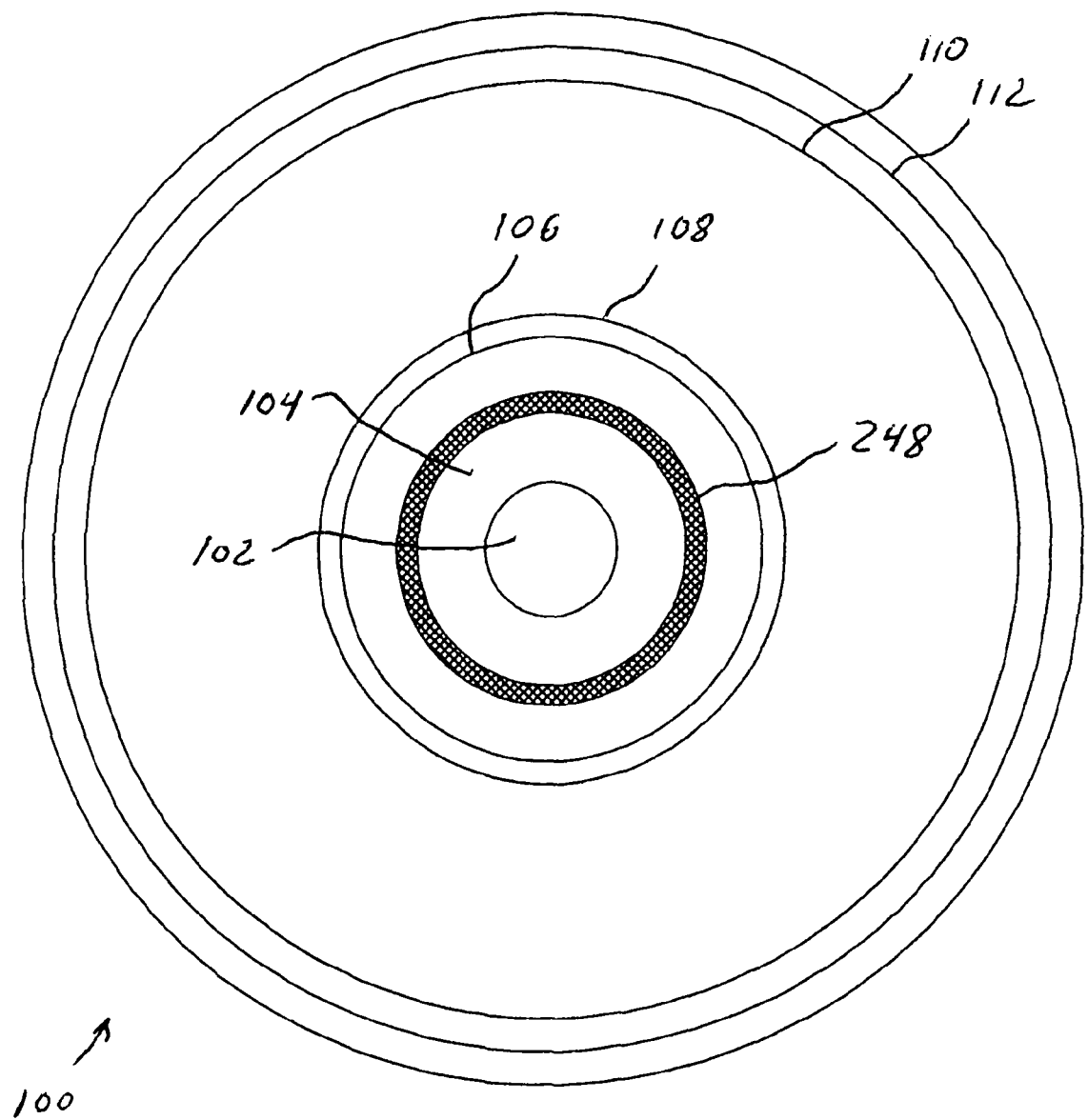
FIGS. 1A and 1B illustrate the data and non-data sides, respectively, of an optical data storage disc in accordance with the invention.

Applicants have determined that the disc approximately 32 mm in diameter is ideal for use with a disc drive that is mechanically compatible with a mobile environment. All current optical media of sufficient storage capacity are larger and hence do not fit this criterion. Conversely, a smaller disc would not have enough storage capacity to allow for the distribution of rich content, such as a full length movie or a high quality video game, even with the use of a short wavelength blue laser and a high numerical aperture (NA) lens.

The amount of data needed to provide a rich user experience is determined by several factors, including picture quality and program length. Rich content that provides a DVD-like quality presentation requires at least 1 GB of storage capacity when advanced MPEG4 compression algorithms are used. A 32 mm disc is optimally sized to allow for 1 GB storage capacity per data layer using short wavelength lasers and high NA lenses.

A 32 mm disc and its associated optical drive can be mounted into a mobile device such as a cell phone, a personal digital assistant (PDA), a mobile internet device (MID), an ultra mobile personal computer (UMPC), or a personal media player (PMP).

To minimize the cost of the associated disc drive, Applicants determined to make the disc compatible with widely available DVD controller integrated circuits (ICs), recognizing that current DVD disc drives are not capable of reading data that is recorded in a high areal density, blue laser based format. To meet all of these criteria, the physical dimensions and layout of the pits pre-recorded on the disc, the layout of the physical data sectors and error correction code (ECC) blocks, and, the layout of higher level data structures must be defined. These are described below.

To ensure that the user data recorded on the disc can be read by a DVD controller IC, the physical format of the data sectors and ECC blocks, the data format, scrambling, channel RLL coding, substitution tables, etc., should be the same as those found in the current DVD standard. These parameters are well known to those skilled in the art and can be found, for example, in the standards document "Standard ECMA-267 $3^{rd}$ edition—April 2001, Section 4," which is incorporated herein by reference. The physical size of the data pits which represent user data on the disc and the radial spacing between data pits, i.e. pitch of the data track spiral, must be carefully designed such that the optical transfer function of an optical disc drive used to read the disc closely matches the optical transfer function of a standard DVD optical disc drive. Moreover, the rotational velocity of the disc must be designed so that all channel frequencies render the format compatible with existing DVD-ROM type optical drive controller integrated circuits.

The area of the recording layer where data is recorded is referred to as the Information Zone of the disc. The Information Zone in turn is divided into three parts: The Lead-in Zone, the Data Zone, and the Lead-out Zone. The Data Zone is where the main user data of entertainment or educational content, e.g., a movie or video game, is recorded. The Lead-in Zone contains control information. The Lead-out Zone allows for a continuous smooth read-out.

Figure 1B:
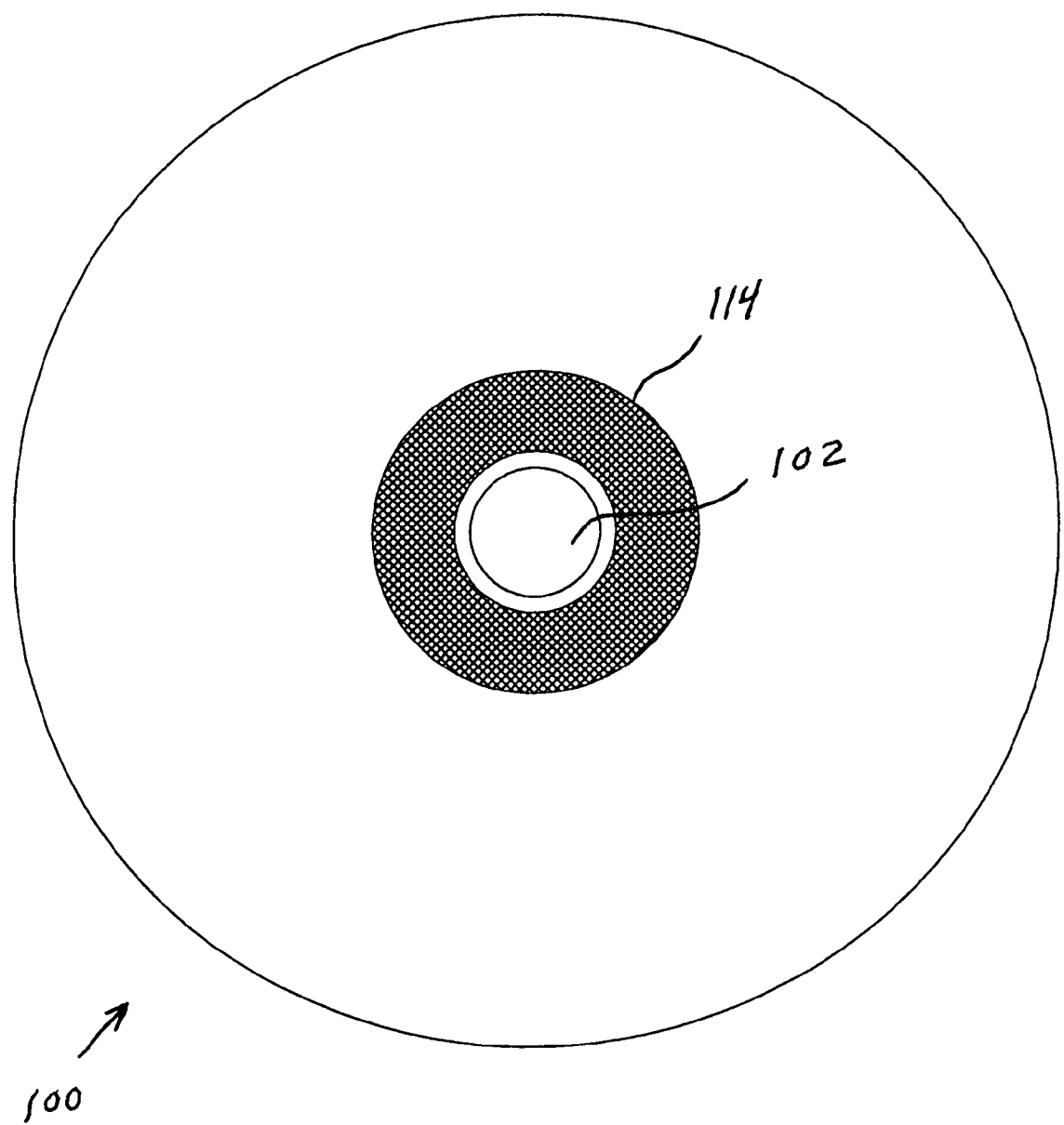

FIGS. 1A and 1B illustrate a disc 100 from the data and non-data sides, respectively. Referring to FIG. 1A, which shows the data side of disc 100, near a center hole 102 is a chuck interface area 104 which, as described below, contacts the chuck of a drive spindle when disc 100 is loaded into a disc drive. The numeral 106 designates the start radius of the Lead-in Zone, the numeral 108 designates the start radius of the Data Zone, the numeral 110 designates the end radius of the Data Zone, and the numeral 112 designates the end radius of the Lead-out Zone. The numeral 248 designates the stacking ring, which is described below. Referring to FIG. 1B, which shows the non-data side of disc 100, a recessed area 114 is shown for holding a retainer ring (described below) which is used to hold disc 100 on the spindle of a disc drive.

The start and end radii of the Data Zone must be specified so that the single layer data storage capacity in a single recording layer is 1 GB. The start radius is constrained by the requirement that a single DVD ECC block (16× physical sectors of 2048 user bytes each) cannot be longer than one turn of the data track spiral, i.e., $R_{start} \geq L_{ECC}/2\pi$, where $R_{start}$ is the start radius and $L_{ECC}$ is length of a DVD ECC block.

This requirement ensures that a physical defect on the disc can only occur once in any given ECC block, thereby maintaining the correction power of the error correction code. Also, the outer radius of the Data Zone should be no greater than 14.8 mm, allowing at least 1.2 mm at the outer radius of the 32 mm diameter disc for outer-diameter molding effects.

To meet these requirements, the channel bit length ($T_c$) is set at 67 nm±1%, the minimum bit length ($L_{3T}$) is set at 201 nm, the track pitch averaged over the Data Zone is set at 0.378 μm±0.005 μm (with a track pitch between any adjacent pair of tracks limited to 0.378 μm±0.010 μm). The critical dimensions of the data layer in a disc of this invention are summarized in Table 1.

TABLE 1

| Parameter | |
|---|---|
| Channel Bit Length ($T_c$) | 67 nm ± 1% |
| Minimum Pit Length ($L_{3T}$) | 201 nm |
| Track Pitch ($L_t$) | 378 nm ± 0.005 μm |
| Areal Density ($\rho_a$) | 12.74 Gbit/in² |
| 1X Velocity (V) | 1.75 m/sec |
| 1X User Transfer Rate ($R_d$) | 1.39 MB/sec |
| Data Zone Start Radius ($R_{id}$) | 7.000 mm |
| Data Zone Stop Radius ($R_{od}$) | 14.578 mm |
| Areal Data Density ($\rho_a$) | 12.74 Gbit/in² |
| Single Data Layer Disc Capacity | 1.0 GB |

Tables 2 and 3 summarize the layout of the Information Zone in a disc of this invention. Table 2 shows dimensions and values for a disc that contains a Burst Cutting Area (BCA); Table 3 shows dimensions and values for a disc that does not contain a BCA.

TABLE 2

| Zone | Nominal Start Radius {mm} | Length {μm} | Length {sectors} | Length {Kbytes} | Start Physical Sector (HEX) | Relative Physical Sector (Decimal) |
|---|---|---|---|---|---|---|
| Initial Zone | 6.332265 | 12.596 | 512 | 1024 | 00029080h | −28544 |
| BCA (Start) | 6.344862 | 390.654 | 16384 | 32768 | 00029280h | −28032 |
| Buffer Zone 0 | 6.735516 | 146.579 | 6400 | 12800 | 0002D280h | −11648 |
| Reference Code Zone | 6.882095 | 2.900 | 128 | 256 | 0002EB80h | −5248 |
| Buffer Zone 1 | 6.884995 | 11.587 | 512 | 1024 | 0002EC00h | −5120 |
| Control Data Zone (256X) | 6.896582 | 92.003 | 4096 | 8192 | 0002EE00h | −4608 |
| Buffer Zone 2 | 6.988585 | 11.415 | 512 | 1024 | 0002FE00h | −512 |
| Data Zone | 7.000000 | 7577.963 | 524288 | 1048576 | 00030000h | 0 |
| Lead-out Zone Start | 14.577963 | 146.287 | 13744 | 27488 | 000B0000h | 524288 |
| Lead-out Zone End | 14.724250 | — | | | 000B35B0h | 538032 |

TABLE 3

| Zone | Nominal Start Radius {mm} | Length {μm} | Length {sectors} | Length {Kbytes} | Start Physical Sector (HEX) | Relative Physical Sector (Decimal) |
|---|---|---|---|---|---|---|
| Buffer Zone 0 | 6.332265 | 549.830 | 23296 | 46592 | 00029080h | −28544 |
| Reference Code Zone | 6.882095 | 2.900 | 128 | 256 | 0002EB80h | −5248 |
| Buffer Zone 1 | 6.884995 | 11.587 | 512 | 1024 | 0002EC00h | −5120 |
| Control Data Zone (256X) | 6.896582 | 92.003 | 4096 | 8192 | 0002EE00h | −4608 |
| Buffer Zone 2 | 6.988585 | 11.415 | 512 | 1024 | 0002FE00h | −512 |

TABLE 3-continued

| Zone | Nominal Start Radius {mm} | Length | | Start Physical Sector (HEX) | Relative Physical Sector (Decimal) |
|---|---|---|---|---|---|
| | | {μm} | {sectors} {Kbytes} | | |
| Data Zone | 7.000000 | 7577.963 | 524288 1048576 | 00030000h | 0 |
| Lead-out Zone Start | 14.577963 | 146.287 | 13744 27488 | 000B0000h | 524288 |
| Lead-out Zone End | 14.724250 | — | | 000B35B0h | 538032 |

A disc of this invention can have one or more data layers. Herein we describe single and dual data layer discs but discs having more than two data layers are possible. In single data layer discs, hereafter referred to as Type A discs in keeping with DVD nomenclature, there is one Information Zone. In dual data layer discs, hereafter referred to as Type C discs in keeping with DVD nomenclature, the number of Information Zones depends on the type of disc. In Parallel Track Path (PTP) mode, there is one Information Zone per layer. In dual data layer Type C discs in Opposite Track Path (OTP) mode, there is only one Information Zone extending over two layers, and the Information Zone has a Middle Zone in each layer to allow the read out beam to move from Layer 0 to Layer 1. In Type C OTP-type discs the Middle Zone is substituted for the Lead-out Zones in both data layers, and what would otherwise be the Lead-in Zone in Layer 1 becomes the Lead-out Zone. In Type C discs, the data layer nearest the entrance surface is designated Layer 0; the data layer furthest from the entrance surface is designated Layer 1.

Figure 2:
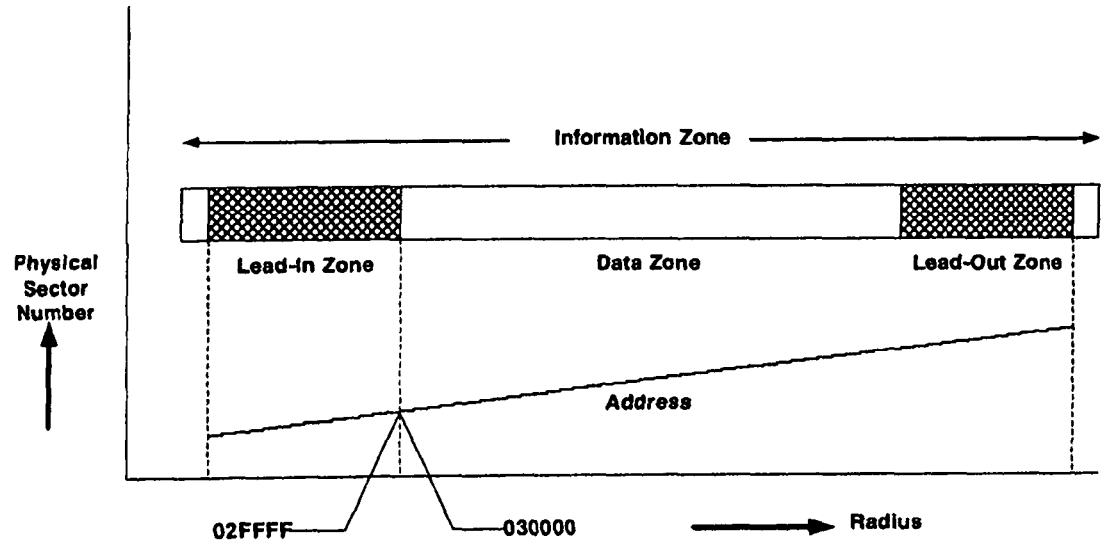
FIG. 2 illustrates the physical sector numbering of a single data layer disc in accordance with the invention.
Figure 3:
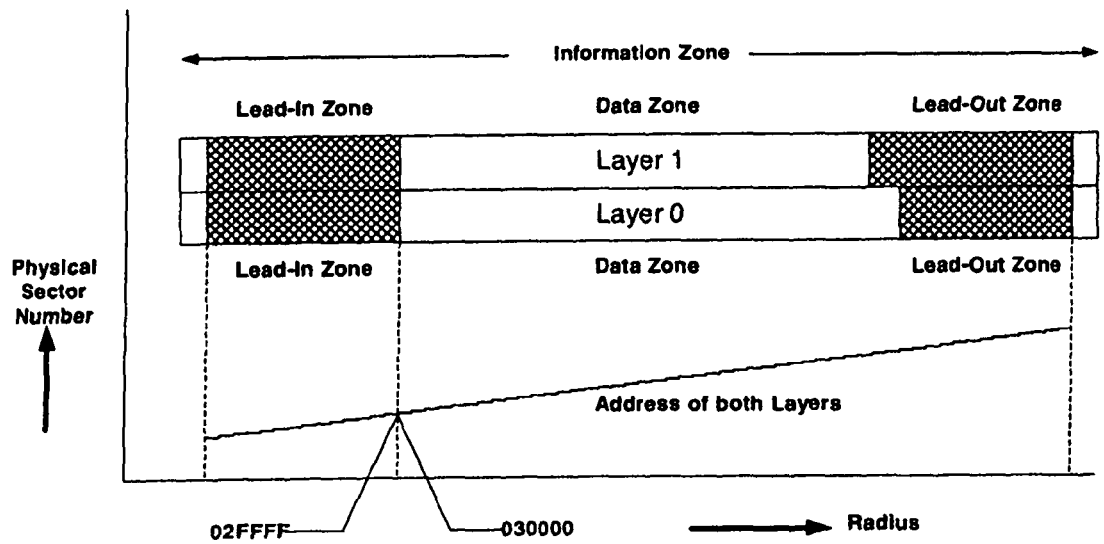
FIG. 3 illustrates the physical sector numbering of a parallel track path (PTP) dual data layer disc in accordance with the invention.
Figure 4:
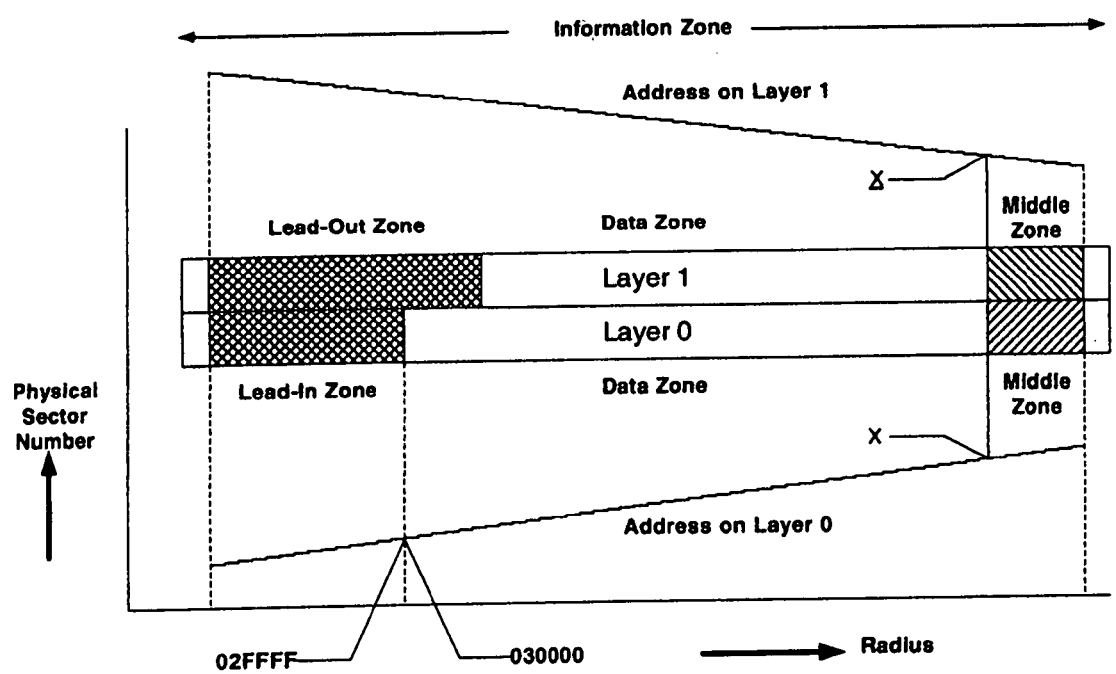
FIG. 4 illustrates the physical sector numbering of an opposite track path (OTP) dual data layer disc in accordance with the invention.

The location of the Lead-in, Data and Lead-out Zones and the system for numbering the physical sectors in Type A and Type C (both PTP and OTP type) discs is illustrated in FIGS. 2-4. In accordance with DVD nomenclature, the first physical sector of the Data Zone has the sector number 030000h and is recorded at the beginning of the Data Zone at a radius=7.000 mm per Table 1. As shown in FIG. 2, in single data layer discs, the sector number of the physical sectors increases by 1 for each physical sector. As shown in FIG. 3, in dual data layer discs in PTP mode, the sector number of the physical sectors increases by 1 for each physical sector. The physical sectors are numbered in the same way on Layer 0 and on Layer 1. As shown in FIG. 4, in dual data layer discs in OTP mode, the sector number of the physical sectors increases by 1 for each physical sector from 030000h to the highest sector number on Layer 0. The first sector number on layer 1 is derived from this highest sector number by inverting its bits, viz. changing from "zero" to "one" and vice versa. Further sector numbers on Layer 1 increase by 1 for each physical sector. The physical sector chosen to be that with the highest sector number in the Data Zone on Layer 0 should be such that the inverted value of its sector number is a multiple of 16.

The Lead-in zone is the innermost zone of the Information Zone. It consists of the following parts, as shown in Tables 2 and 3:
  Initial Zone (if BCA is present)
  Reference Code Zone
  Control Data Zone
  Buffer Zones The sector number of the first physical sector of each part is indicated in Tables 2 and 3 in hexadecimal notation. The Control Data Zone includes 256 identical ECC blocks for redundancy and the Reference Code Zone and Control Data Zone are separated by approximately 12 um-wide buffer zones. The redundancy of the critical physical format information in the Control.Data Zone is increased over that present in the conventional DVD discs due to the increased areal density of this design as compared with DVD discs. This extra redundancy insures the integrity of the physical format information described below. Buffer Zones 0, 1, and 2 each consists of 512 physical sectors from 32 ECC blocks.

The Initial Zone is present in the case that a Burst Cutting Area (BCA) exists and is used as a lead-in to the BCA zone. The data of the data frames eventually recorded as physical sectors in the Initial Zone is set to 00h.

The Reference Code Zone comprises 128 physical sectors from eight ECC blocks. Each physical sector in the Reference Code Zone has a (3T-6T-7T) channel bit pattern achieved by setting all 2048 data bytes of each corresponding data frame to AC hexadecimal. Scrambling is only applied to first 160 data bytes of the first data frame of each ECC block. The purpose of the Reference Code Zone is to provide channel bit patterns which a compliant optical drive may use to optimize its read equalizer.

The Control Data Zone consists of 4096 physical sectors from 256 ECC blocks. The content of the 16 physical sectors of each ECC block is repeated 256 times. The structure of an ECC block in the Control Data Zone is shown in Table 4. Thus each of the four types of information is repeated four times in each ECC block of the Control Data Zone. However, since the 256 ECC blocks in the Control Data Zone are identical, it is possible for some data sections to be extended across sectors of the same data type to increase the length of data for that data type. For example, the four sectors representing the Disc Manufacturing Information may be identical or may be different depending on implementation. However, all four of the Physical Format Information sectors are identical.

TABLE 4

Physical Format Information
2 × 2048 Bytes
Disc Manufacturing Information
2 × 2048 Bytes
Vmedia Secure Platform Information
2 × 2048 Bytes
Content Provider Information
2 × 2048 Bytes
Physical Format Information
2 × 2048 Bytes
Disc Manufacturing Information
2 × 2048 Bytes
Vmedia Secure Platform Information
2 × 2048 Bytes
Content Provider Information
2 × 2048 Bytes Physical Format Information The Physical Format Information, comprising the 4×2048 bytes shown in Table 4, is described in the table shown in FIG. 5. Each of the 2048 byte sectors is identical. The byte definitions given in FIG. 5 are described more fully below.

Bytes 0000h-0017h—Secure Platform Disc Authentication String:

These 24 bytes are coded as the 24 byte null terminated ASCII character string identifying the firm under whose authority the disc was manufactured.

Byte 0018h—Media Type

The Media Type is defined according to Table 5:

TABLE 5

| Media Type | Value | Description |
| --- | --- | --- |
| Video disc | 00h | Disc contains video data. |
| ROM data disc | 01h | Disc contains ROM data. |
| Reserved | 02h-0Fh | Reserved |

Byte 0019h—Media Version

The Media Version is defined according to Table 6:

TABLE 6

| Media Version | Value | Description |
| --- | --- | --- |
| Single Layer Disc | 00h | Disc contains a single data layer. |
| Dual Layer OTP Type Disc | 01h | Disc contains two data layers in OTP configuration |
| Dual Layer PTP Type Disc | 02h | Disc contains two data layers in PTP configuration |
| Reserved | 03h-FFh | Reserved |

Bytes 001Ah-001Dh—Maximum Data Sectors Per Surface

These four bytes represent the maximum number of 2048 byte data sectors per data surface for the specified media. For a 1 GB video or data disc this is set to 00080000h.

Bytes 001Eh—Maximum Data Transfer Rate

The maximum data transfer rate for the specified media is indicated as a multiple of 11.12 Mbit/sec, which is the 1× user data transfer rate for a ROM video or data disc. This byte contains the value (N−1) where the maximum data transfer rate is specified as NX; i.e. the byte has value 00h for a 1× (N=1) maximum user data transfer rate.

Byte 001Fh—Reserved

The definition of this byte is reserved and should be coded as 00h.

Bytes 0020h-002Bh Data Zone Allocation

These twelve bytes are used to indicate the distribution of data on the disc. The first four bytes, 0020h-0023h, indicate the first sector of the Data Zone and are set to 00030000h for all ROM video and data discs. The middle four bytes, 0024h-0027h, indicate the last data sector of the Data Zone independent of the number of layers and Media Version. For a single layer disc, this is the address of the last data sector in the Data Zone for Layer 0. For a dual layer disc (both OTP and PTP) this is the address of the last data sector in the Data Zone for Layer 1. The last four bytes, 0028h-002Bh indicate the address of the last data sector in the Data Zone on Layer 0 for both single and dual layer discs. The assignment of the data sector addresses in the Data Zone is described in FIGS. 2-4.

Byte 002Ch—BCA Descriptor

This byte specifies whether or not there is a Burst Cutting Area on the disc.

bit(s) b7 to b1 are reserved and are set to ZERO bit(s) b0, the BCA flag, specifies whether or not a BCA exists if set to ZERO, it indicates that a BCA does not exist if set to ONE, it indicates that a BCA exists on a Type A or a Type C disc Byte 002Dh—Secure Platform Content Security Descriptor This byte specifies whether or not content of the disc is protected by a Secure Platform Content Security System and the type of protection.

The lower nibble <3:0> defines the security type for the disc in accordance with Table 7.

TABLE 7

| Security Type | Value | Description |
| --- | --- | --- |
| None | 0h | A Secure Platform Content Security System is not implemented |
| CPPM | 1h | The Secure Platform Content Security System is implemented using a CPPM compatible system. |
| Reserved | 2h-Fh | Reserved |

The upper nibble <7:4> defines the Version number for the particular Vmedia Secure Platform Content Security System implemented.

Bytes 002Eh-03FFh—Reserved

The definition of these bytes is reserved and they are coded as 00h.

Bytes 0400h-07FFh—Reserved

The definition of these bytes is reserved and they are coded as 00h.

Disc Manufacturing Information

The content of the 4×2048 byte physical sectors comprising the Disc Manufacturing Information area are not pre-defined and may include any information that the disc manufacturer requires. The four sectors may be identical or different.

Vmedia Secure Platform Information

The content of the 4×2048 byte physical sectors comprising the Vmedia Secure Platform Information area are to be used by the particular security system implemented. The four sectors may be identical or different.

Content Provider Information

The content of the 4×2048 byte physical sectors comprising the Content Provider Information area are not pre-defined and are to be used by the content provider. The four sectors may be identical or different.

Lead-out and Middle Zones

The main data of the data frames eventually recorded as physical sectors in both the Lead-Out Zone (Type A and Type C (PTP) discs) and the Middle Zone (Type C (OTP) disc) are set to 00h. These zones are provided to allow smooth positioning of the read-back head during seeks.

Burst Cutting Area

Another aspect of the invention is a novel Burst Cutting Area (BCA) recording technology which allows the BCA to be pre-embossed at the time the disc is injection-molded. Table 2 describes the layout of the Information Zone when a BCA is present. The BCA is an optional feature on the disc and, unlike previous DVD applications, is designed to be pre-embossed into the ROM disc in the lead-in area. However, the BCA of this invention is defined is such a way that current DVD-compatible chip sets can decode the recorded BCA data. If the BCA is implemented, it should meet the following requirements.

Figure 6:
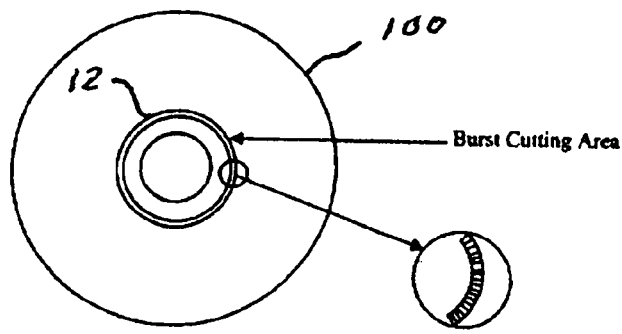
FIG. 6 illustrates the location of the Burst Cutting Area on an optical data storage disc according to the invention.

In discs where the BCA is present, in reflection it appears as a series of "dark" bars on a light (mirror) background much like a usual printed bar code, as shown in FIG. 6. Typically in the case of a CD or DVD disc, a $CO_2$ or YAG laser is used to "burn" the BCA into the disc after fabrication. Because the burning process removes the reflective metal layer from the disc, the "burned" bars have low reflectivity and can be easily read by the optical pick-up head in the drive. However, in some cases, it is desirable to have the BCA present in the master and stamped or injection molded into every disc. In these cases, the BCA can only be read by the optical pick-up head as an amplitude variation caused by diffraction because the entire disc is coated by a reflective metal layer. Since, light from the pick-up head only diffracts out of the collection aperture of the objective lens from the edges of pits present on the disc (either radial edges which form tracks or circumferential edges which form data pits) it is necessary to create a pattern of radial edges on the disc which appear to the pick-up head as continuous circumferential stripes or bars due to diffraction. We describe herein a novel BCA structure which allows the BCA to be mastered onto the disc and to be read by a 0.72 NA, 405 nm pick up head attached to standard DVD controller electronics.

The purpose of the code recorded in the BCA is to provide a link between the content of a disc and the software to be used with that disc. Therefore, only the structure of this code is specified and not the content of the data bytes. The BCA code should be readable by the optical disc drive with which the disc will be used. If present, it is pre-mastered on the data layer of a Type A disc or on Layer 1 of a Type C disc. The BCA is an annular area within the Lead-in zone which should extend between the radii defined Table 2. The start of the BCA zone is at radius 6.344862 mm. The end of the BCA zone is at radius 6.735516 mm. The width of the BCA zone is defined to be about 390 µm which should allow it to be read without tracking; i.e. the tracking servo loop is open. The BCA code should be written with a series of lower reflectance stripes arranged in circumferential direction and extending in the radial direction between the diameters defined in Table 2 according to FIG. 6, which shows a Burst Cutting Area 12 on disc 100.

Figure 7:
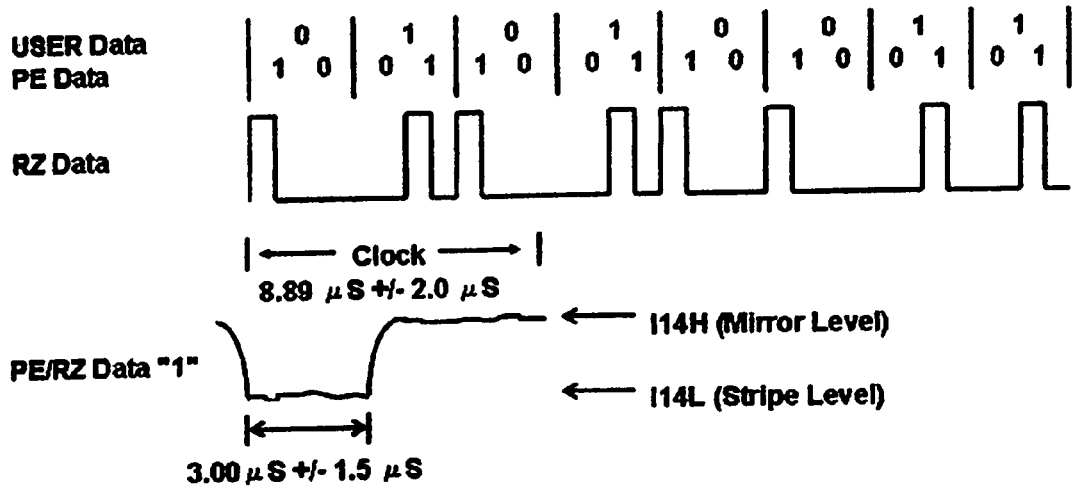
FIG. 7 illustrates coding and modulation of the read-out signal from the Burst Cutting Area.
Figure 8:
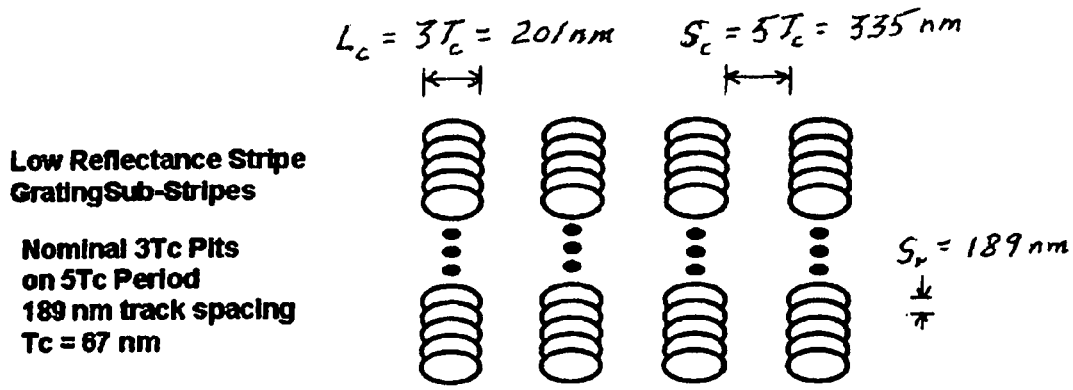
FIG. 8 shows the details of the low reflectance stripe and sub-stripes of the Burst Cutting Area.

In order for the BCA to be readable by a standard DVD-ROM controller IC, data intended for the BCA code should be encoded by phase encoding according to which a "zero" bit is represented by two Channel bits set to "one zero" and a "one" bit by two Channel bits set to "zero one". The sequence of Channel bits should be modulated according to the Return-to-Zero modulation method. The coding and modulation methods are shown in FIG. 7. The low reflectance stripes should be formed corresponding to pulses after the RZ modulation. They should not exceed half the width of a Channel bit. The low reflectance stripes are pre-embossed into the disc. Each "stripe" of the BCA is represented as a series of sub-stripes which together form a diffraction grating as shown in FIGS. 7 and 8. In order to create a diffraction grating which appears as an continuous amplitude reduction throughout the grating (dark bar), the circumferential length ($L_c$) of the pits, the circumferential spacing ($S_c$) of the pits, and, the radial pitch ($S_r$) of the pits (i.e., the distance between pit centers) must be carefully chosen to correlate with the wavelength and objective lens NA present in the optical pick up of the optical drive. As shown in FIG. 8, the $L_c$ of the pits which comprise the sub-stripe are chosen to be the optical equivalent of 3*67 nm=201 nm or $3T_c$, the $S_c$ of the pits which comprise the sub-stripe is chosen to be the optical equivalent of 5*67 nm=335 nm or $5T_c$, and, the $S_r$ of the pits is chosen to be 0.5× the nominal track spacing of 378 nm, or 189 nm. At this $S_r$ the pits from adjacent tracks overlap and form a somewhat continuous groove in the radial direction. These radial grooves are spaced the optical equivalent of 335 nm apart and, taken together, form a diffraction grating which appears as a continuous dark stripe or bar to the optical pick up. Each stripe in the BCA comprises the appropriate number of sub-stripes which appear to the optical pick up as a single low reflectivity stripe. This grating will ensure low noise on the low reflectance I14L stripe level. The radial pitch of 189 nm will ensure low noise on the low reflectance I14L stripe due to track crossing/runout which occurs because the tracking servo system is off during read back of the BCA. The dimensions and spacing of the sub-stripes are illustrated in FIG. 8.

The length; format, encoding, etc., of the stripes which comprise the BCA are chosen so that they appear to be identical to a standard DVD BCA, allowing them to be read and decoded by a standard DVD controller IC. The BCA code is the same as a standard DVD code and can be found, for example, in the standards document "Standard ECMA-267 $3^{rd}$ edition—April 2001, Section 4," which is incorporated herein by reference.

In order to guarantee that the BCA is readable using current DVD-ROM controller ICs, the read-out signal from the BCA must meet the following requirements.

The amplitude level of the signal corresponding to a low-reflectance stripe should not exceed (4*I14L+I14H)/5.

The Channel bit length of a BCA Channel bit, expressed in microseconds, should be 8.89 µs at a rotational frequency of 30 Hz.

An edge position of the BCA signal should be the position at which the BCA signal crosses the mean level between I14L and I14H The length of pulses corresponding to the low-reflectance stripe should be 3.00 µs±1.50 µs.

The deviation of the time interval between successive leading edges should not exceed 2.00 µs.

The deviation of the time interval between the centers of successive pulses should not exceed 1.50 µs. The center of a pulse is the middle point between the leading edge and the trailing edge.

The use of a diffraction grating to represent the stripes of a BCA can be extended to a laser wavelength (λ) other than 405 nm and an objective lens numerical aperture other than 0.72 by scaling the $L_c$, $S_c$, and, $S_r$ of the pits comprising the sub-stripes according to the wavelength and then adjusting these dimensions for the numerical aperture of the objective lens. The $L_c$, $S_c$, and, $S_r$ of the pits comprising the diffraction grating are scaled with wavelength according to the following formula:

$$L_c(\lambda) \approx [\lambda/405]*3T_c$$

$$S_c(\lambda) \approx [\lambda/405]*5T_c$$

$$S_r(\lambda) \approx [\lambda/405]*3T_c$$

These three parameters are then adjusted for the particular objective lens NA to ensure a nearly constant low level sum signal from the four elements of the quadrant detector (see FIG. 20) when the light from the pick-up is over the "dark" stripes of the BCA.

For protection and ease of handling, the disc of this invention is preferably housed in a cartridge of the kind illustrated in FIGS. 9-12. The cartridge includes a plastic shell, which covers the non-data side and lateral edges of the disc, and a sheet metal cover plate, which covers the data side of the disc. The cartridge is robust enough to be dragged across flat surfaces, e.g., a table top, without affecting disc operation, easily handled by people with varying levels of dexterity, able to be identified with the use of labeling, and, sufficiently large so as to provide protection against a potential choking hazard to children. Access to the disc data surface is provided by a sliding shutter that is opened upon insertion into the drive. The shutter and bottom cover of the cartridge are preferably made of stainless steel, which provides a rugged design and allows for the short working distance of a high numerical aperture (NA) lens and short wavelength laser. Special features of the cartridge design offer protection from incorrect orientation of disc insertion into the drive and a locking mechanism that holds the shutter in the closed position. The cartridge is designed such that the disc is reliably mounted onto the spindle of the associated compatible optical drive.

FIGS. 9A and 9B are two exploded views of a cartridge 20, FIG. 9A being taken from above, FIG. 9B being taken from below. Cartridge 20 includes a shell 200, typically made of plastic, a cover plate 202, made of sheet metal, a shutter 204, optical disc 100, and a latch 208.

The detailed structure and method of assembling cartridge 20 will now be described.

Figure 10B:
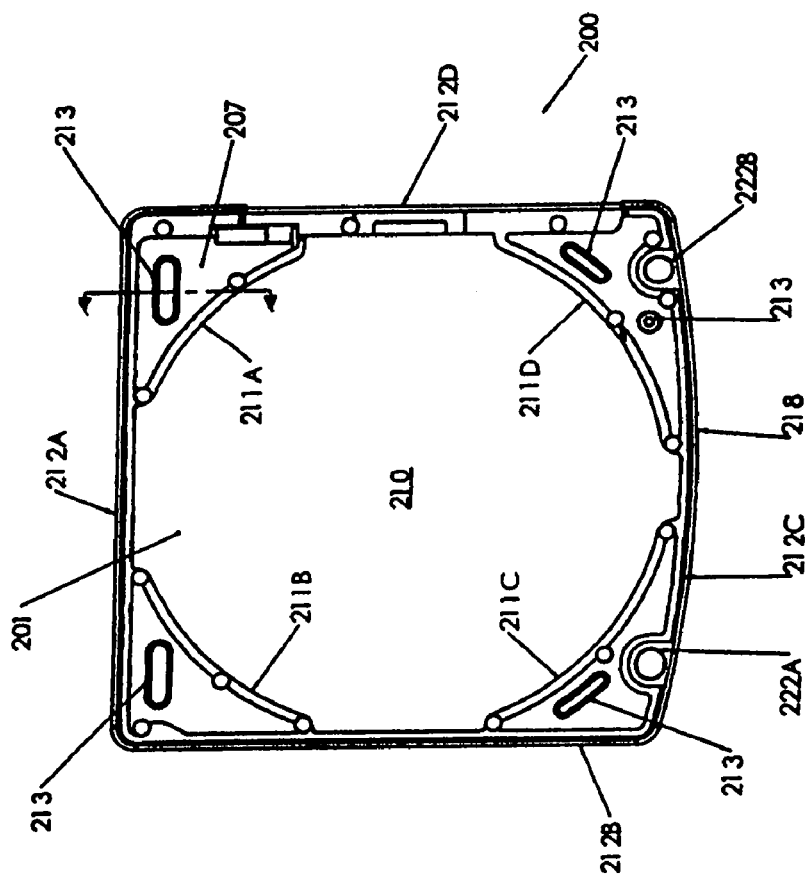
FIGS. 10A and 10B illustrate the plastic shell of the cartridge from the outside and inside, respectively.
Figure 10A:
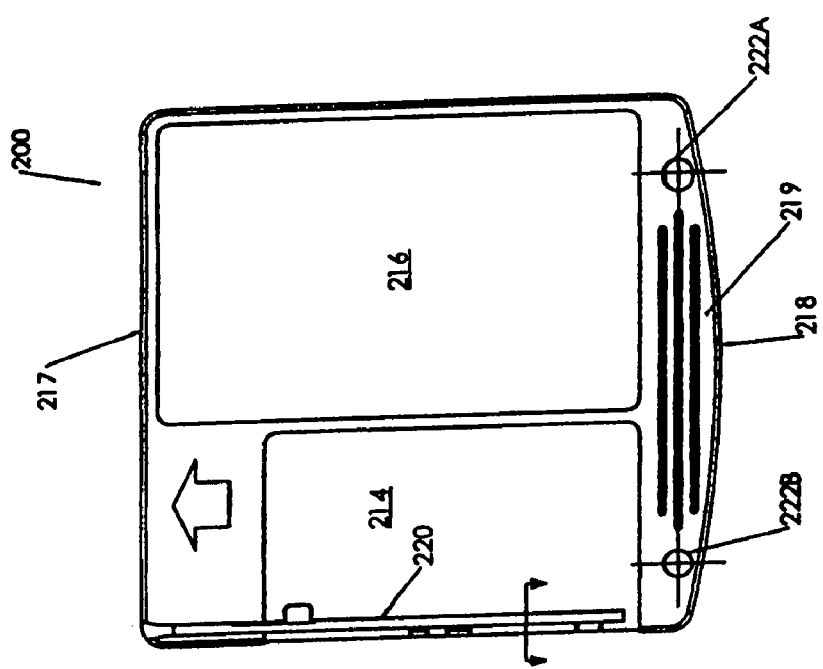

FIGS. 10A and 10B illustrate shell 200 from the outside and inside, respectively. Shell 200 may be made of lens grade polycarbonate and may be manufactured by a standard injection molding process. For a 32 mm diameter disc 100, the lateral dimensions of shell 200 are approximately 36 mm×36 mm, and shell 200 is approximately 3 mm thick. Shell 200 has a leading edge 217 and a trailing edge 218 Trailing edge 218 is arc-shaped (e.g., radius≈78 mm); leading edge 217 and the side edges are generally linear.

As shown in FIG. 10A, the outside of shell 200 has shallow recesses 214 and 216, which may be recessed by 0.2 mm with respect to the surrounding portions of shell 200. As described below, a portion of shutter 204 slides in recess 214, and recess 216 can be used to hold printed material, such as a movie label. Alignment holes 222A and 222B fit over corresponding alignment posts (not shown) in the disc drive to assure that cartridge 20 is accurately positioned in the drive. Near the trailing edge 218 are three longitudinal grooves 219, approximately 0.4 mm wide and separated by 0.6 mm, to assist the user in gripping cartridge 20 when inserting it into a disc drive.

As shown in FIG. 10B, the inside of shell 200 includes a floor 201 and a plurality of lateral walls, including four inside walls 211A-211D and four perimeter walls 212A-212D. Each of perimeter walls 212A-212D runs along one side of the perimeter of shell 200. Each of inside walls 211A-211D is formed generally in the shape of a circular arc. Floor 201, inside walls 211A-211D and portions of perimeter walls 212A-212D together define a generally circular disc cavity 210, which is used to hold disc 100. At one corner of shell 200, inside wall 211A and portions of perimeter walls 212A and 212D form a latch cavity 207, which is used to hold latch 208. Five assembly posts 213, located in latch cavity 207 and in three cavities formed by inside walls 211B-211D and perimeter walls 212A-212D, are used to attach cover plate 202 to shell 200.

Figure 11:
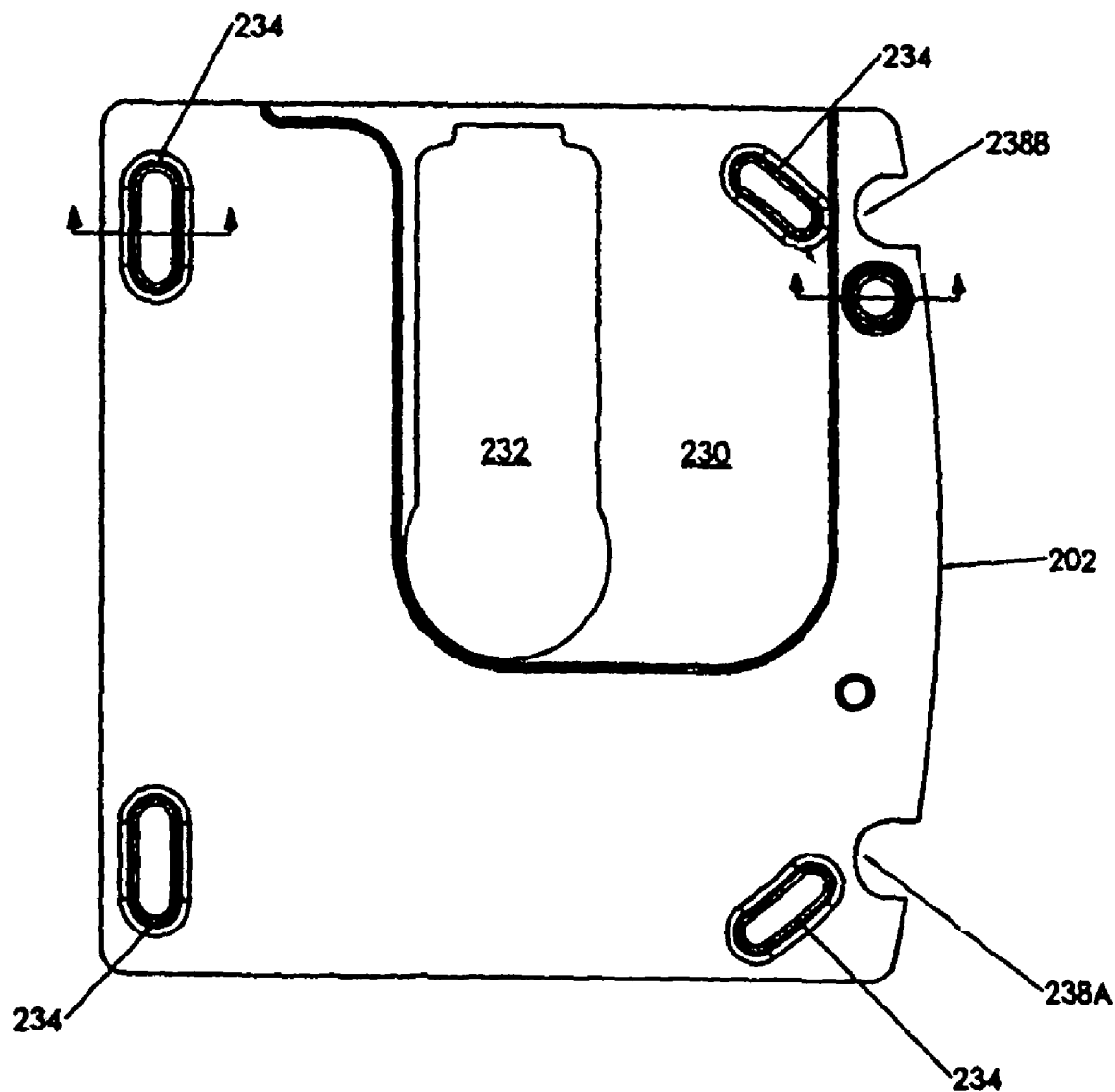
FIG. 11 shows a top view of the sheet metal cover plate of the cartridge.

FIG. 11 shows a top view of cover plate 202. Cover plate 202 can be made of a stainless steel sheet 0.15 mm thick. The stainless steel sheet is stamped to form a recess 230 and a shutter window 232 within recess 230. Recess 230 can be recessed 0.2 mm, for example, with respect to the surrounding portions of cover plate 202. As described below, a portion of shutter 204 slides back and forth in recess 230 to open and close window 232. This movement alternately protects disc 100 from damage and allows data stored on disc assembly 100 to be read by an external optical pickup unit (not shown). Near the corners of cover plate 202 are five recessed holes 234, through which assembly posts 213 project to attach cover plate 202 to shell 200. Notches 238A and 238B in cover plate 202 are aligned with alignment holes 222A and 222B in shell 200 to accommodate the alignment posts (not shown) in the disc drive.

Figure 12C:
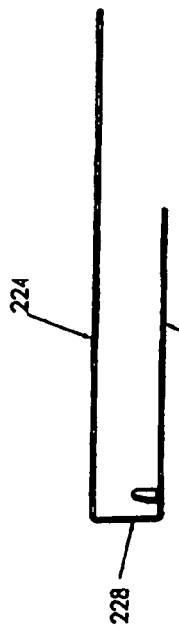
FIGS. 12A-12D illustrate the structure of the shutter in the cartridge.
Figure 12D:
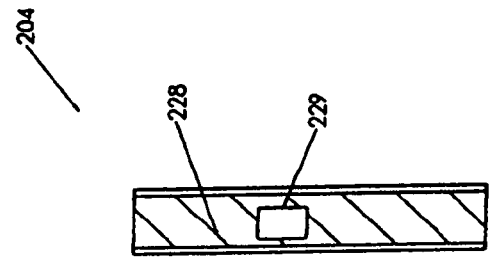
Figure 12A:
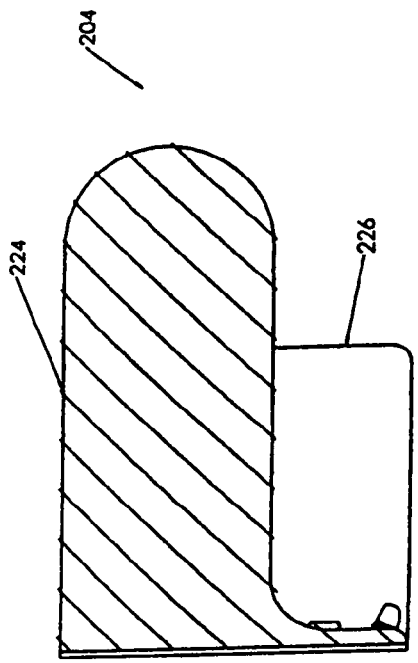
Figure 12B:
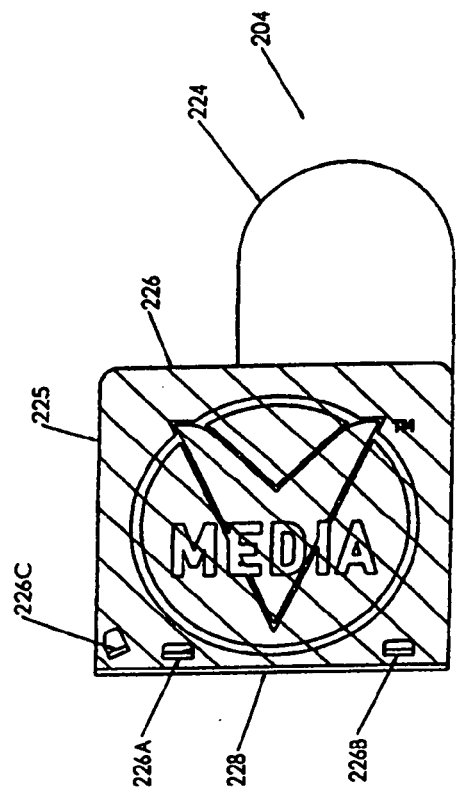

FIGS. 12A-12D illustrate the structure of shutter 204. As is evident from FIG. 12C, shutter 204 is U-shaped. Shutter 204 may be made from a sheet of stainless steel 0.13 mm thick, for example. When cartridge 20 is assembled, shutter 204 essentially wraps around one edge of cartridge 20 and slides along the edge of cartridge 20 to alternately open and close a shutter window in cover plate 202. As shown in FIG. 12C, shutter 204 includes a protective flap 224 and a clamping flap 226, which are connected together by an edge wall 228. FIG. 12A shows shutter 204 from the side of protective flap 224; FIG. 12B shows shutter 204 from the side of clamping flap 226; and FIG. 12D shows shutter 204 from the side of edge wall 228. As shown in FIG. 12B, clamping flap 226 is stamped to form tracking tabs 226A and 226B and a latch tab 226C. Tracking tabs 226A and 226B slide along a groove formed in shell 200 as shutter 204 moves between its open and closed positions. As shown in FIG. 12D, an opening 229 is formed in edge wall 228. Opening 229 engages a feature in the disc drive to assist in opening and closing shutter 204 as cartridge 20 is inserted into and withdrawn from the disc drive.

Figure 13A:
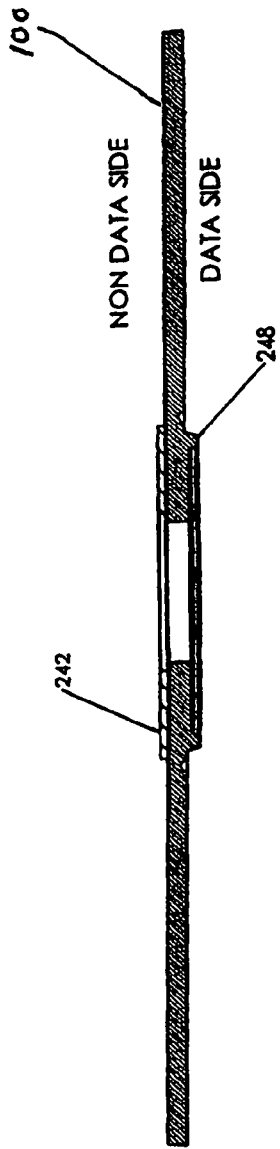
FIG. 13A is a cross-sectional view of the disc including the retainer ring.
Figure 13B:
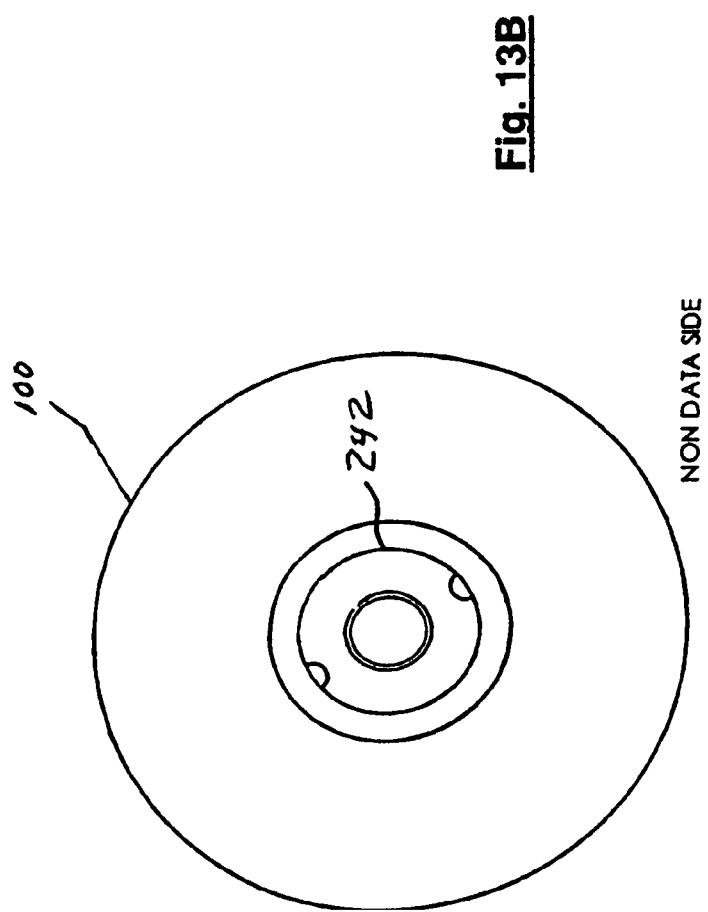
FIG. 13B is a plan view of the disc and retainer ring.

FIG. 13A shows a cross-sectional view of disc 100 with an annular retainer ring 242 attached to the non-data side of disc 100. FIG. 13B is a plan view of disc 100 and retainer ring 242 from its non-data side. Retainer ring 242 is glued or otherwise bonded to the non-data side of optical disc 100 within recessed area 114. Since, as described below, retainer ring 242 is not used to align disc 100 to a disc drive, retainer ring 242 does not have to be positioned on disc 100 with great precision. Retainer ring 242 is made of a magnetic or magnetizable material such as stainless steel.

Figure 14:
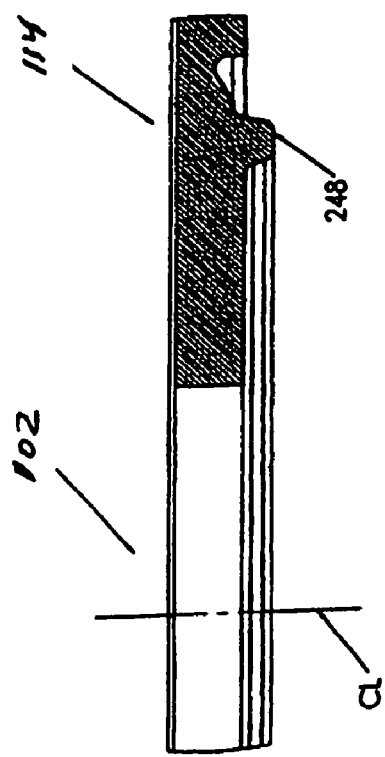
FIG. 14 is a detailed cross-sectional view of the disc in the area around center hole.
Figure 15:
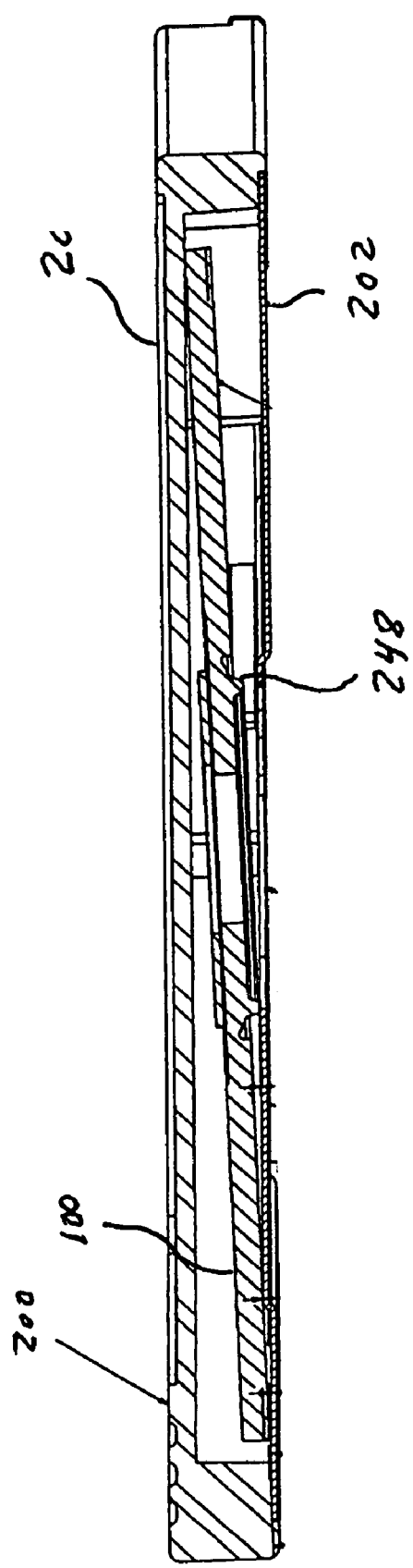
FIG. 15 is a cross-sectional view of the cartridge and disc illustrating how the stacking ring prevents the data recorded on the disc from coming into contact with the cartridge.

FIG. 14 is a detailed cross-sectional view of optical disc 100 in the area around center hole 102. On the non-data side of disc 100, recessed area 114, which may be 0.05 mm deep, is formed in the area where retainer ring 242 will be attached to optical disc 100 by gluing or another bonding process e.g. ultrasonic welding. On the data side of optical disc 100, a stacking ring 248 is formed concentric with center hole 102. The stacking ring 248 is located inside the Information Zone of optical disc 100 and is sized and positioned so as to prevent the data recorded in the Information Zone from coming into contact with the cartridge, specifically cover plate 202, when disc 100 is enclosed in cartridge 200, as shown in FIG. 15. When disc assembly 100 is in a static position, with its non-data side resting on floor 201 of disc cavity 210, the clearance between stacking ring 248 and the inside surface of cover plate 202 is about 0.35 mm.

The thickness of cartridge 20 is 2.8 mm. Optical disc 100 has a maximum thickness (including magnetic or magnetizable retainer ring 242) of 0.9 mm, leaving about 1.9 mm for the remainder of cartridge 20.

Figure 16:
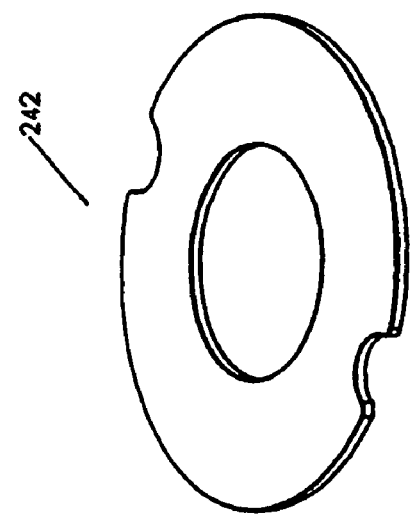
FIG. 16 is a perspective view of the retainer ring.

FIG. 16 is a perspective view of retainer ring 242. Retainer ring 242 has an inner diameter of 4.5 mm and an outer diameter of 9.2 mm. Retainer ring 242 may be formed of a 0.2 mm thick sheet of stainless steel or another magnetic material.

Cartridge 20 is assembled by placing latch 208 into cavity 207, placing disc 100 into disc cavity 210, attaching cover plate 202 to shell 200 using assembly posts 213, and affixing shutter 204 on the outside of cartridge 200. The use of a monolithic shell and a cover plate which is attached to one side of the shell greatly simplifies the fabrication of the cartridge.

Figure 17:
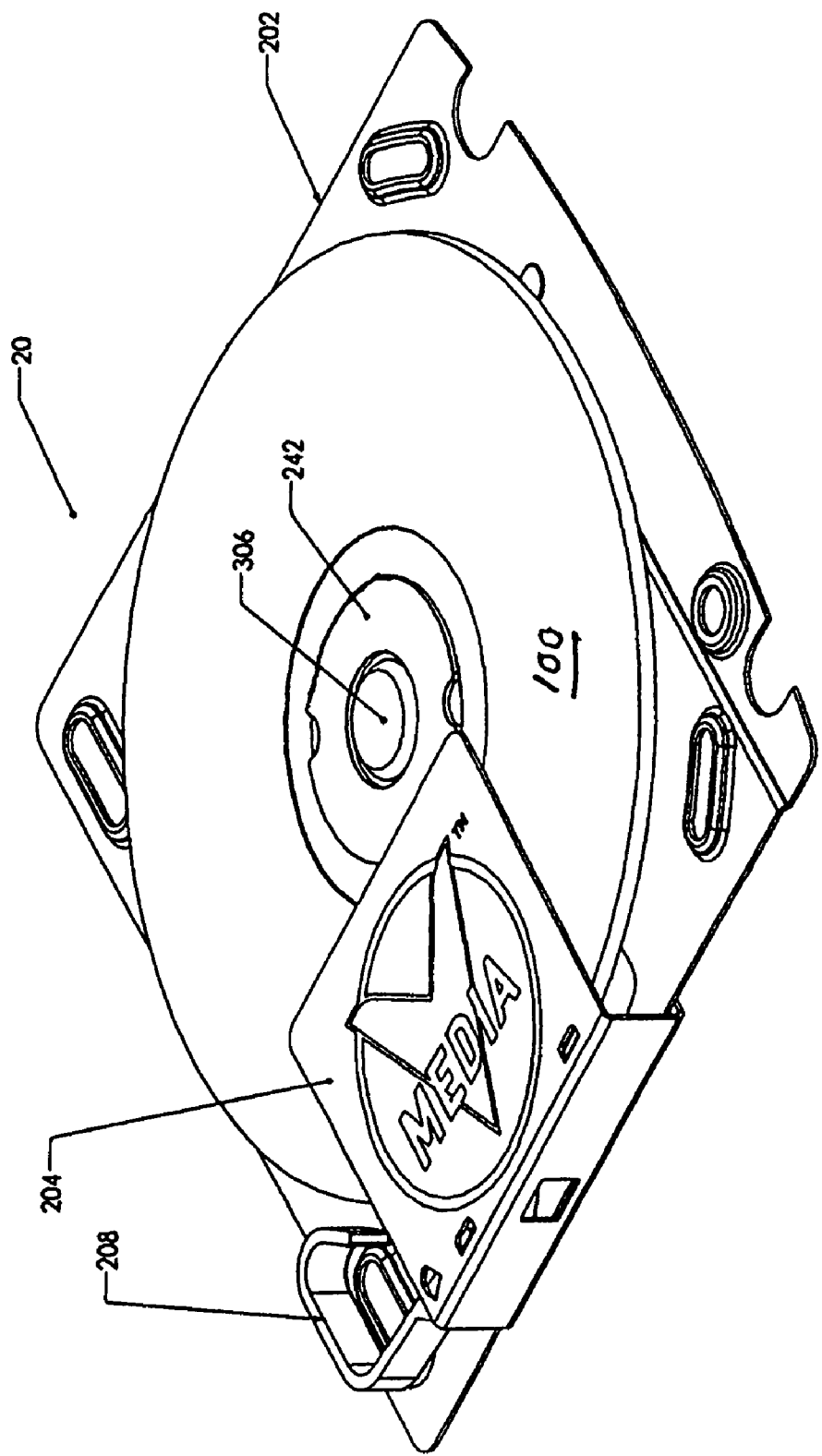
FIGS. 17-19 are cutaway views showing how a spindle of a disc drive engages the center hole of the disc.
Figure 18:
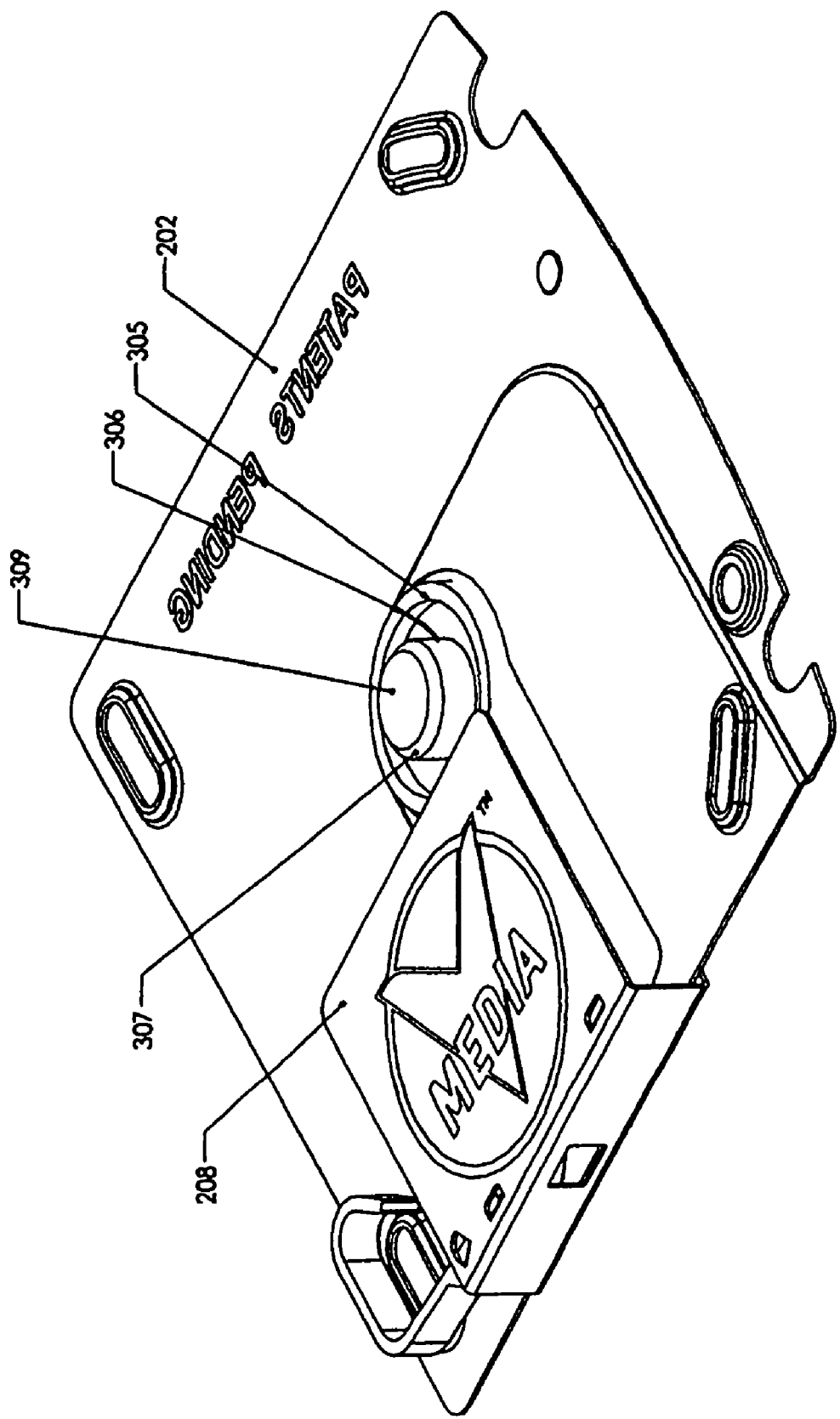
Figure 19:
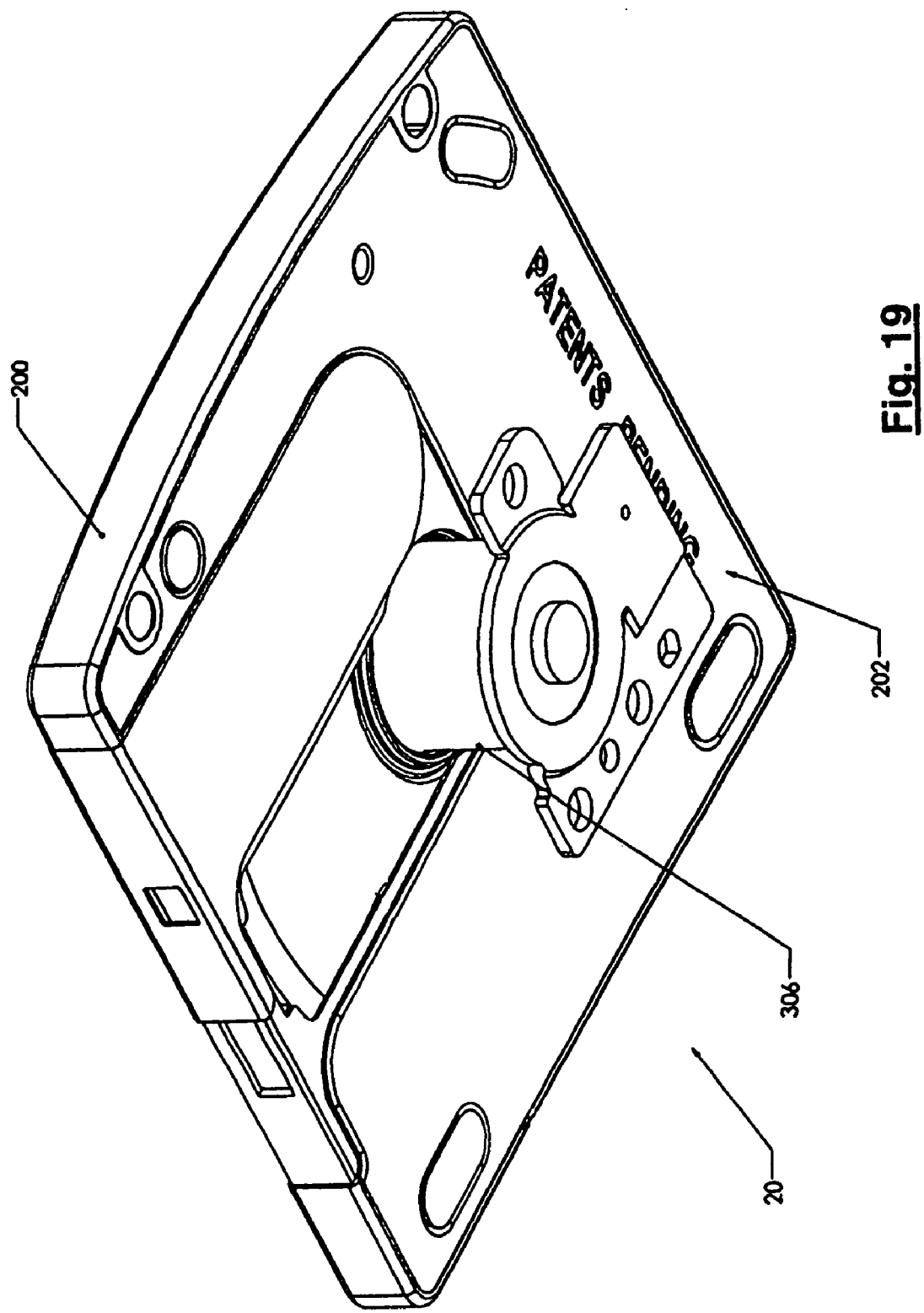

FIGS. 17-19 are cutaway views that show how a spindle 306 of a disc drive engages center hole 102 of disc 100. FIG. 17 is a view of cartridge 20 oriented as it would be during this process with shell 200 removed. FIG. 18 is a similar view with disc 100 removed. FIG. 19 is a view from the underside of cartridge 20 when cartridge 20 has been fully loaded into a disc drive.

As shown in FIG. 18, spindle 306 contains an annular magnet 305, which is recessed from a protruding end portion 309 of spindle 306. Magnet 305 can be made of a permanent magnetic material such as NiFe or NiCrFe. As shown in FIG. 17, when cartridge 20 is fully inserted into a disc drive, spindle 306 moves upward so as to insert protruding end portion 309 into center hole 102. A tapered surface 307 on protruding end portion 309 helps to guide protruding end portion 309 into center hole 102. Center hole 102 can have a diameter of 4.010-4.022 mm and is tightly toleranced with respect to protruding end portion 309 so as to correctly align disc 100 with the optical head of the disc drive. As noted above, retainer ring 242 does not align disc 100 to the disc drive. As protruding end portion 309 enters center hole 102, magnet 305 attracts or pulls down on retainer ring 242 which, as described above, is glued onto the non-data side of optical disc 100. Two alignment posts (not shown) in the disc drive fit into alignment holes 222A and 222B to assure that cartridge 20 is accurately positioned in the disc drive.

Alternatively, if retainer ring 242 is made of a magnetic material, magnet 306 can be replaced by a component made of a magnetizable material which is attracted by the magnetic field of retainer ring 242. In short, both retainer ring 242 and the attractive component within the disc drive are made of magnetic or magnetizable materials. If the attractive component in the disc drive is made of a magnetic material, retainer ring 242 may be made of a magnetizable material. If retainer ring 242 is made of a magnetic material, the attractive component within the disc drive may be made of a magnetizable material. In either case, the attractive magnetic force between retainer ring 242 and the attractive component in the disc drive is used to hold disc 100 on spindle 306.

The structure and fabrication of cartridge 20 are described in greater detail in Published Application No. 2006/0048167, which is incorporated herein by reference in its entirety.

As noted above, it is a critical aspect of disc 100 that it be compatible with a disc drive that includes a conventional DVD controller along with an optical pickup head that operates with a nonconventional blue 405 nm laser beam and a 0.72 NA lens. This unique combination utilizes readily available electronics while taking advantage of the advanced optics required to provide a 1 GB data capacity on a 32 mm disc. The physical layout of the data on disc 100 is necessary to make this combination operative.

Figure 20:
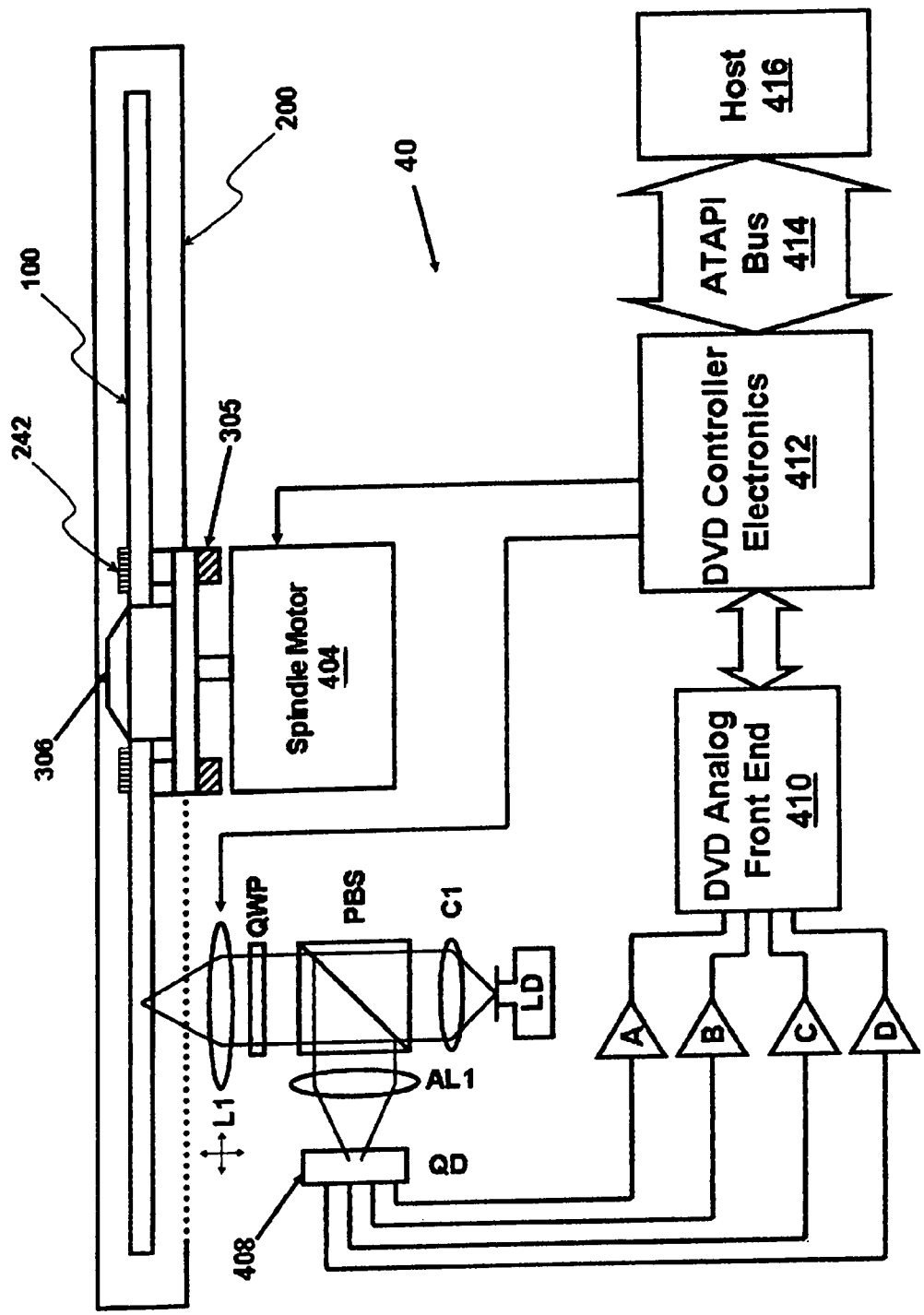
FIG. 20 is a schematic diagram of a disc drive for reading data from an optical data storage disc of this invention.

FIG. 20 is a schematic diagram of a disc drive 40 that meets these criteria. Also shown are disc 100 in cartridge 200 mounted on spindle 306 that is driven by a spindle motor 404 within disc drive 40. Retainer ring 242 on the non-data side of disc 100 is attracted by magnet 305 so as to hold disc 100 on spindle 306.

An optical drive pickup head 408 within disc drive 40 includes a 405 nm laser diode LD, a collimator lens C1, a polarizing beam splitter PBS, a quarter wave plate circularizer QWP, a 0.72 NA objective lens L1, an astigmatic focusing lens AL1, and a quadrant photodetector QD. In alternative embodiments of optical drive pickup head 408, collimator lens C1 may be omitted. The operation of pickup head 408 is similar to the operation of pickup heads commonly found in DVD and CD drives. The linear polarized laser beam from laser diode LD is collimated by collimator lens C1, passes through the polarizing beam splitter PBS, is circularized by the quarter wave plate QWP and focused onto disc 100 by the objective lens L1. The laser beam reflected from the data surface of disc 100 is re-collimated by objective lens L1, returned to the orthogonal linear polarization by quarter wave plate QWP, reflected by the polarizing beam splitter PBS, and focused by the astigmatic focusing lens AL1 onto the quadrant photodetector QD. The electrical signals from the four elements of quadrant photodetector QD are buffered by four amplifiers A, B, C and D, and provided as inputs to a standard commercial DVD analog front end processor IC 410. The output of IC 410 is delivered to an IC 412 that contains a DVD controller and (optionally) other electronics. The combination of the DVD analog front end processor IC 410 and the DVD controller IC 412 provide all the functions required to reproduce the digital signal stored on disc 100. The output signal from DVD controller IC 412 is transmitted via an ATAPI bus 414 to a mobile host device 416, such as a cell phone.

The DVD analog front end processor IC 410 could be a Mitsubishi Electric AN22023A and the DVD controller IC 412 could be a Mitsubishi Electric MN103S89F. Alternatively, a "system on a chip" such as the VIA VT7218S DVD SOC or the MediaTek MT1355 SOC could be used to perform both the front end and controller functions.

The embodiments of this invention described above are illustrative and not limiting. Many alternative embodiments within the broad scope of this invention will be apparent to those of skill in the art.

We claim:

1. An optical data storage disc, the optical data storage disc measuring approximately 32 mm in diameter, the disc comprising a Data Zone consisting of user data of entertainment or educational content, wherein a channel bit length of data in the Data Zone is 67 nm±1% and wherein an average track pitch of data in the Data Zone is 378 nm±0.005 μm.

2. The optical data storage disc of claim 1 wherein the disc comprises a Control Data Zone, the Control Data Zone including 256 identical error correction code (ECC) blocks.

3. The optical data storage disc of claim 1 wherein a retainer ring is attached to a surface of the disc, the retainer ring comprising a magnetic or magnetizable material.

4. The optical data storage disc of claim 1 wherein a stacking ring protrudes from the data side of the disc, the stacking ring being located inside an Information Zone of the disc.

5. A cartridge containing an optical data storage disc, the cartridge comprising a plastic shell having lateral walls and a floor, the cartridge further comprising a sheet metal cover plate attached to the plastic shell, a nondata side of the disc being positioned adjacent the floor of the plastic shell, a data side of the disc being positioned adjacent the sheet metal cover plate, the optical data storage disc measuring approximately 32 mm in diameter, the disc comprising a Data Zone consisting of user data of entertainment or educational content, wherein a channel bit length of data in the Data Zone is 67 nm±1% and wherein an average track pitch of data in the Data Zone is 378 nm±0.005 μm.

6. The cartridge of claim 5 wherein a retainer ring is attached to a surface of the disc, the retainer ring comprising a magnetic or magnetizable material.

7. The cartridge of claim 5 wherein a stacking ring protrudes from the data side of the disc, the stacking ring being located inside an Information Zone of the disc, the stacking ring being sized and positioned so as to prevent data recorded in the Information Zone from coming into contact with the cartridge.

8. The cartridge of claim 5 wherein the disc comprises a Control Data Zone, the Control Data Zone including 256 identical error correction code (ECC) blocks.

9. A combination comprising an optical data storage disc and a disc drive, the optical data storage disc measuring approximately 32 mm in diameter, the disc drive comprising an optical pickup head utilizing a blue laser beam for reading data recorded on the disc, the disc drive comprising an analog front end processor and a DVD controller for processing a signal output from the analog front end processor, wherein the disc comprises a Data Zone consisting of user data of entertainment or educational content, and wherein a channel bit length of data in the Data Zone is 67 nm±1% and wherein an average track pitch of data in the Data Zone is 378 nm±0.005 µm.

* * * * *